(12) United States Patent
Tokuyama et al.

(10) Patent No.: US 11,299,994 B2
(45) Date of Patent: Apr. 12, 2022

(54) FIRST-STAGE STATOR VANE FOR GAS TURBINE, GAS TURBINE, STATOR VANE UNIT FOR GAS TURBINE, AND COMBUSTOR ASSEMBLY

(71) Applicant: Mitsubishi Hitachi Power Systems, Ltd., Yokohama (JP)

(72) Inventors: Kentaro Tokuyama, Yokohama (JP); Kenji Sato, Yokohama (JP); Keisuke Matsuyama, Tokyo (JP); Takaya Koda, Tokyo (JP); Shunsuke Torii, Yokohama (JP); Tetsuya Shimmyo, Yokohama (JP); Shinya Hashimoto, Yokohama (JP); Akihiro Murakami, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 106 days.

(21) Appl. No.: 16/618,431

(22) PCT Filed: May 22, 2018

(86) PCT No.: PCT/JP2018/019646
§ 371 (c)(1),
(2) Date: Dec. 2, 2019

(87) PCT Pub. No.: WO2019/003724
PCT Pub. Date: Jan. 3, 2019

(65) Prior Publication Data
US 2021/0140329 A1 May 13, 2021

(30) Foreign Application Priority Data
Jun. 29, 2017 (JP) .............................. JP2017-127261

(51) Int. Cl.
*F01D 9/02* (2006.01)
*F01D 25/12* (2006.01)

(52) U.S. Cl.
CPC .............. *F01D 9/023* (2013.01); *F01D 25/12* (2013.01); *F05D 2240/121* (2013.01);
(Continued)

(58) Field of Classification Search
CPC .......... F01D 5/141; F01D 5/186; F01D 5/187; F01D 9/023; F01D 9/041; F01D 25/12;
(Continued)

(56) References Cited

U.S. PATENT DOCUMENTS

| 6,840,048 B2 | 1/2005 | Han et al. |
| 7,721,547 B2 | 5/2010 | Bancalari et al. |

(Continued)

FOREIGN PATENT DOCUMENTS

| JP | 61-006606 | 1/1986 |
| JP | 64-33766 | 2/1989 |

(Continued)

OTHER PUBLICATIONS

International Search Report dated Aug. 14, 2018 in International (PCT) Application No. PCT/JP2018/019646 with English translation.

(Continued)

*Primary Examiner* — Jesse S Bogue
*Assistant Examiner* — Loren C Edwards
(74) *Attorney, Agent, or Firm* — Wenderoth, Lind & Ponack, L.L.P.

(57) ABSTRACT

A first-stage stator vane for a gas turbine includes: a first portion partially defining an airfoil which includes a pressure surface, a suction surface, and a trailing edge; and a second portion positioned at a leading-edge side of the airfoil with respect to the first portion, the second portion
(Continued)

having a recess portion or a protruding portion. The recess portion or the protruding portion has a pair of side wall surfaces, and an angle formed between the pair of side wall surfaces is less than 90 angular degrees.

19 Claims, 16 Drawing Sheets

(52) U.S. Cl.
CPC .... *F05D 2240/122* (2013.01); *F05D 2240/35* (2013.01); *F05D 2240/55* (2013.01)

(58) Field of Classification Search
CPC ......... F05D 2240/121; F05D 2240/122; F05D 2240/35; F05D 2240/55; F05D 2220/3212; F02C 7/18; F02C 7/28
See application file for complete search history.

(56) References Cited

U.S. PATENT DOCUMENTS

| | | | |
|---|---|---|---|
| 8,403,626 B2 | 3/2013 | Hasselqvist et al. | |
| 8,701,415 B2 | 4/2014 | Flanagan et al. | |
| 9,395,085 B2 | 7/2016 | Budmir et al. | |
| 9,429,032 B2 | 8/2016 | Bothien et al. | |
| 9,482,106 B2 | 11/2016 | Düsing et al. | |
| 2004/0060298 A1* | 4/2004 | Han | F01D 9/02 60/772 |
| 2007/0017225 A1 | 1/2007 | Bancalari et al. | |
| 2010/0115953 A1* | 5/2010 | Davis, Jr. | F23R 3/46 60/737 |
| 2012/0247125 A1* | 10/2012 | Budmir | F01D 9/023 60/805 |
| 2014/0109579 A1 | 4/2014 | Düsing et al. | |
| 2016/0153292 A1 | 6/2016 | Fleuriot et al. | |
| 2017/0030219 A1 | 2/2017 | Fleuriot et al. | |

FOREIGN PATENT DOCUMENTS

| | | |
|---|---|---|
| JP | 2001-289003 | 10/2001 |
| JP | 2004-116992 | 4/2004 |
| JP | 2008-544211 | 12/2008 |
| JP | 2011-117700 | 6/2011 |
| JP | 4878392 | 2/2012 |
| JP | 5479058 | 4/2014 |
| JP | 2014-84874 | 5/2014 |
| JP | 5726267 | 5/2015 |
| JP | 5726268 | 5/2015 |
| JP | 2016-104990 | 6/2016 |

OTHER PUBLICATIONS

International Preliminary Report on Patentability and Written Opinion of the International Searching Authority dated Jan. 9, 2020 in International (PCT) Application No. PCT/JP2018/019646 with English translation.

* cited by examiner

FIRST-STAGE STATOR VANE FOR GAS TURBINE, GAS TURBINE, STATOR VANE UNIT FOR GAS TURBINE, AND COMBUSTOR ASSEMBLY

TECHNICAL FIELD

The present disclosure relates to a first-stage stator vane for a gas turbine, a gas turbine, a stator vane unit for a gas turbine, and a combustor assembly.

BACKGROUND ART

In a gas turbine including a plurality of combustors, combustion vibration may occur near the outlets of the combustors due to acoustic propagation between the combustors. Such combustion vibration may become a factor that impairs stable operation of the gas turbine. Thus, there have been several techniques developed to reduce combustion vibration that occurs near the outlets of the combustors.

For instance, Patent Documents 1 and Patent Documents 2 disclose a gas turbine whose annular gas flow passage at the combustor outlet portion (turbine inlet portion) is divided in the circumferential direction, in order to suppress thermal acoustic pulsation caused by connection between the outlet portions of adjacent combustors or resonance of an undesirable mode.

More specifically, Patent Document 1 discloses a gas turbine whose combustor transition part (transition piece) has a side wall extension portion that extends into the turbine-side space over the combustor outlet in the axial direction. In this gas turbine, the side wall extension portion of the combustor transition part extends to the vicinity of the first vane (first-stage stator vane) disposed at the most upstream side of the turbine, at the upstream side of the first vane. Furthermore, the side wall extension portion divides the annular gas flow passage partially in the circumferential direction between the combustor outlet and the first vane, such that the fluid connection between the combustor outlet portions is partially cut off.

Further, Patent Document 2 discloses a gas turbine that includes a baffle that extends to the leading edge of the stator vane from the transition piece of the combustor, disposed between the combustor outlet and the stator vane (first-stage stator vane). In this gas turbine, the annular space (gas flow passage) formed between the combustor outlet and the stator vane is divided in the circumferential direction by the above described baffle. Accordingly, the intersection in the circumferential direction between the gas flow between a combustor and a stator vane and the gas flow between the adjacent combustor and the stator vane is blocked.

CITATION LIST

Patent Literature

Patent Document 1: JP5726267B
Patent Document 2: U.S. Pat. No. 6,840,048B

SUMMARY

Problems to be Solved

As described above, the gas turbines disclosed in Patent Documents 1 and 2 are configured such that the annular gas flow passage formed between the combustor outlet and the first-stage stator vane is divided at least partially in the circumferential direction, and thus it is possible to reduce the acoustic propagation between adjacent combustors and suppress combustion vibration due to the acoustic propagation.

However, in the gas turbine described in Patent Document 1, the side wall extension portion of the transition piece for blocking the annular gas flow passage (extension portion of the transition-piece side wall) is disposed at a distance from the first vane in the axial direction. Thus, in a case where the relative positional relationship in the axial direction between the transition piece and the first vane is displaced from the positional relationship intended at the time of design, the gap in the axial direction between the extension portion of the transition-piece side wall and the first vane becomes larger, which may limit the effect to suppress the acoustic propagation between adjacent combustors. Such displacement takes place due to, for instance, assembly errors of the gas turbine or deformation of the gas turbine due to aging.

Furthermore, in the gas turbine disclosed in Patent Document 2, the baffle that divides the annular gas flow passage extends to reach the leading edge of the stator vane from the transition piece of the combustor, and the outlet portions of adjacent combustors are shut off from one another by the baffle. On the other hand, in the gas turbine, the transition piece of the combustor, the baffle plate, and the stator vane are provided integrally, and thus it is difficult to perform maintenance such as replacement of parts. In a case where the transition piece of the combustor and the stator vane are provided separately to improve maintainability, if the relative positional relationship in the axial direction between the transition piece and the stator vane adjacent to the transition piece (first-stage stator vane) is displaced from the positional relationship intended at the time of design, the gap in the axial direction between the downstream-side end of the transition piece and the first-stage stator vane becomes larger, which may limit the effect to suppress the acoustic propagation between adjacent combustors.

In view of the above, an object of at least one embodiment of the present invention is to provide a first-stage stator vane for a gas turbine, a gas turbine, a stator vane unit for a gas turbine, and a combustor assembly, whereby it is possible to reduce combustion vibration due to acoustic propagation between outlet portions of a plurality of combustors, even if the relative positional relationship in the axial direction is displaced from the positional relationship intended at the time of design.

Solution to the Problems (1) According to at least one embodiment of the present invention, a first-stage stator vane for a gas turbine includes: a first portion partially forming an airfoil which includes a pressure surface, a suction surface, and a trailing edge; and a second portion positioned at a leading-edge side of the airfoil with respect to the first portion, the second portion having a recess portion or a protruding portion. The recess portion or the protruding portion of the second portion has a pair of side wall surfaces, and an angle formed between the pair of side wall surfaces is less than 90 angular degrees.

When the first-stage stator vane provided as a separate member from the combustor is used, while it is possible to reduce thermal stress that occurs in the combustors during operation of the gas turbine, combustion vibration may occur at different frequencies due to acoustic propagation between outlet portions of a plurality of combustors via the gap between the outlet portions of the combustors and the first-stage stator vane.

In this regard, with the above configuration (1), when the recess portion or the protruding portion positioned at the leading-edge side of the first-stage stator vane is engaged with a combustor-side counterpart member (e.g. the combustor itself or a member disposed between the combustor and the first-stage stator vane), it is possible to cause a pair of side wall surfaces of the recess portion or the protruding portion of the first-stage stator vane to overlap with the counterpart member in the axial direction. Furthermore, with the angle formed between the pair of side wall surfaces of the recess portion or the protruding portion of the first-stage stator vane being less than 90 angular degrees, even if the first-stage stator vane is relatively displaced mainly in the axial direction with respect to the combustors due to displacement of the relative positional relationship in the axial direction during operation of the gas turbine from the positional relationship intended at the time of design, for instance, it is possible to suppress an increase in the gap, in the circumferential direction, between the pair of side wall surfaces of the recess portion or the protruding portion of the first-stage stator vane and the counterpart member that brings the outlet portions of adjacent combustors into communication. Accordingly, it is possible to hinder acoustic propagation between the outlet portions of the plurality of combustors. Thus, it is possible to reduce combustion vibration due to acoustic propagation between the outlet portions of the plurality of combustors while reducing thermal stress that occurs in the combustors during operation of the gas turbine. Accordingly, the frequency of the combustion vibration that needs to be addressed decreases, and it is possible to operate the gas turbine stably.

(2) In some embodiments, in the above configuration (1), the second portion includes: at least one flat surface disposed next to the recess portion or the protruding portion; and at least one connection surface disposed between the at least one flat surface and a surface of the airfoil of the first portion, the connection surface having a leading-edge side end connected to the flat surface and a trailing-edge side end continuously connected to the surface of the airfoil.

With the above configuration (2), the flat surface is disposed next to the recess portion or the protruding portion of the second portion of the first-stage stator vane in the width direction, and thus an acoustic propagation path formed between the recess portion or the protruding portion of the first-stage stator vane and the counterpart member has a bend shape formed by the flat surface and the side wall surfaces of the recess portion or the protruding portion of the first-stage stator vane. Accordingly, it is possible to suppress acoustic propagation between the outlet portions of the plurality of combustors effectively. Furthermore, the connection surface disposed between the above described flat surface and the surface of the airfoil has a trailing edge side end continuously connected to the surface of the airfoil, and thus the flow of combustion gas is less likely to cause turbulence compared to a case where the flat surface and the surface of the airfoil are not connected continuously. Accordingly, it is possible to reduce fluid loss in the gas turbine.

(3) In some embodiments, in the above configuration (2), each connection surface is configured such that a tangent direction at a connection point to the flat surface forms an angle of not greater than 20 angular degrees with a bisector of an angle formed between the pair of side wall surfaces.

As described in the above (1), when the recess portion or the protruding portion of the first-stage stator vane is engaged with a combustor-side counterpart member, the pair of side wall surfaces of the recess portion or the protruding portion overlap with the counterpart member in the axial direction, and it is possible to reduce combustion vibration due to acoustic propagation between the outlet portions of the plurality of combustors.

In this case, as in the above configuration (3), when the tangent of the connection surface to the connection point between the connection surface and the flat surface is set to form an angle of not greater than 20 angular degrees with the bisector of the angle formed between the pair of side wall surfaces (that is, the tangent direction of the connection surface is substantially along the bisector), it is possible to suppress turbulence of the flow of combustion gas by guiding the flow of combustion gas along the axial direction after passing the outlet portions of the combustors to the surface of the airfoil. Accordingly, it is possible to reduce fluid loss in the gas turbine.

(4) In some embodiments, in any one of the above configurations (1) to (3), the second portion includes at least one cooling hole having a first end and a second end, the first end having an opening into a cooling passage formed inside the first-stage stator vane and the second end having an opening on an outer surface of the recess portion or the protruding portion.

With the above configuration (4), it is possible to supply, via the cooling hole, a cooling fluid from the cooling passage to the gap between the recess portion or the protruding portion of the first-stage stator vane and the counterpart member that the recess portion or the protruding portion is engaged with. With the flow of the cooling fluid supplied to the gap between the recess portion or the protruding portion of the first-stage stator vane and the counterpart member, it is possible to suppress acoustic propagation between the outlet portions of the combustor via the gap, while cooling the first-stage stator vane. Accordingly, it is possible to effectively reduce combustion vibration due to acoustic propagation between the outlet portions of the plurality of combustors.

(5) In some embodiments, in any one of the above configurations (1) to (4), the recess portion or the protruding portion extends along a vane height direction over a length that is not smaller than a half of a length between a root portion and a tip portion of the first-stage stator vane in the vane height direction.

With the above configuration (5), with the recess portion or the protruding portion of the first-stage stator vane being disposed so as to extend along the vane height direction over a length that is not smaller than the length between the root portion and the tip portion in the vane height direction, it is possible to suppress acoustic propagation between the outlet portions of the plurality of combustors by causing the recess portion or the protruding portion to be engaged with a combustor-side counterpart member.

(6) In some embodiments, in any one of the above configurations (1) to (5), the recess portion or the protruding portion is disposed along a vane height direction from a root portion to a tip portion of the first-stage stator vane.

With the above configuration (6), the recess portion or the protruding portion of the first-stage stator vane is disposed along the vane height direction from the root portion to the tip portion of the first-stage stator vane, and thus it is possible to suppress acoustic propagation between the outlet portions of the plurality of combustors more effectively by causing the recess portion or the protruding portion to be engaged with a combustor-side counterpart member.

(7) According to at least one embodiment of the present invention, a gas turbine includes: a plurality of combustors disposed in a circumferential direction, each of the plurality of combustors having an outlet portion including a radial-directional wall portion along a radial direction; and the first-stage stator vane according to any one of the above (1) to (6), positioned at a downstream side of a pair of the radial-directional wall portions which face one another, of the outlet portions of the combustors adjacent to one another in the circumferential direction.

With the above configuration (7), when the recess portion or the protruding portion positioned at the leading-edge side of the first-stage stator vane is engaged with a combustor-side counterpart member (e.g. the combustor itself or a member disposed between the combustor and the first-stage stator vane), it is possible to cause a pair of side wall surfaces of the recess portion or the protruding portion of the first-stage stator vane to overlap with the counterpart member in the axial direction. Furthermore, with the angle formed between the pair of side wall surfaces of the recess portion or the protruding portion of the first-stage stator vane being less than 90 angular degrees, even if the first-stage stator vane is relatively displaced mainly in the axial direction with respect to the combustors due to displacement of the relative positional relationship in the axial direction during operation of the gas turbine from the positional relationship intended at the time of design, for instance, it is possible to suppress an increase in the gap, in the circumferential direction, between the pair of side wall surfaces of the recess portion or the protruding portion of the first-stage stator vane and the counterpart member that brings the outlet portions of adjacent combustors into communication. Accordingly, it is possible to hinder acoustic propagation between the outlet portions of the plurality of combustors. Thus, it is possible to reduce combustion vibration due to acoustic propagation between the outlet portions of the plurality of combustors while reducing thermal stress that occurs in the combustors during operation of the gas turbine. Accordingly, the frequency of the combustion vibration that needs to be addressed decreases, and it is possible to operate the gas turbine stably.

(8) In some embodiments, in the above configuration (7), the pair of radial-directional wall portions overlap, in an axial direction, with the recess portion or the protruding portion of the first-stage stator vane or with an intermediate member held between the first-stage stator vane and the pair of radial-directional wall portions, and the first-stage stator vane includes at least one cooling hole having a first end and a second end, the first end having an opening into a cooling passage formed inside the first-stage stator vane and the second end having an opening into a gap between the first-stage stator vane and at least one of the radial-directional wall portions or the intermediate member.

With the above configuration (8), the pair of radial-directional wall portions of the combustors overlap with the recess portion or the protruding portion of the first-stage stator vane, or the intermediate member, in the axial direction. Thus, even if the first-stage stator vane is relatively displaced mainly in the axial direction with respect to the combustors due to displacement of the relative positional relationship during operation of the gas turbine from the positional relationship intended at the time of design, it is possible to suppress an increase of the gap, in the circumferential direction, between the pair of side wall surfaces of the recess portion or the protruding portion of the first-stage stator vane and the radial-directional wall portions or the intermediate member that brings the outlet portions of adjacent combustors into communication, and hinder acoustic propagation between the outlet portions of the plurality of combustors.

With the above configuration (8), it is possible to supply a cooling fluid from the cooling passage to the gap between the recess portion or the protruding portion of the first-stage stator vane and the radial-directional wall portion or the intermediate member via the cooling hole. With the flow of the cooling fluid supplied to the gap between the recess portion or the protruding portion of the first-stage stator vane and the radial-directional wall portions or the intermediate member, it is possible to suppress acoustic propagation between the outlet portions of the combustors via the gap, while cooling the first-stage stator vane. Accordingly, it is possible to effectively reduce combustion vibration due to acoustic propagation between the outlet portions of the plurality of combustors.

(9) In some embodiments, in the above configuration (7) or (8), when the first-stage stator vane is displaced by a first distance in the axial direction away from the combustors, an increase amount of a size of the gap along a normal direction of the side wall surfaces is smaller than the first distance.

With the above configuration (9), even if the first-stage stator vane is relatively displaced in the axial direction away from the combustors due to displacement of the relative positional relationship in the axial direction of the gas turbine from the positional relationship intended at the time of design, for instance, it is possible to suppress an increase in the gap, in the normal direction, between the pair of side wall surfaces of the recess portion or the protruding portion of the first-stage stator vane and the counterpart member that brings the outlet portions of adjacent combustors into communication. Accordingly, it is possible to hinder acoustic propagation between the outlet portions of the plurality of combustors. Thus, it is possible to reduce combustion vibration due to acoustic propagation between the outlet portions of the plurality of combustors while reducing thermal stress that occurs in the combustors during operation of the gas turbine.

(10) In some embodiments, in any one of the above configurations (7) to (9), the first-stage stator vane is disposed at the downstream side of the pair of radial-directional wall portions for each of the pair of the combustors disposed adjacent to one another in the circumferential direction, the gas turbine further includes a second first-stage stator vane disposed at a circumferential-directional position between the pair of first-stage stator vanes adjacent to one another in the circumferential direction, and the first-stage stator vane extends to an upstream side of the second first-stage stator vane.

Normally, in a gas turbine, the number of stator vanes that form a stator vane row along the circumferential direction is greater than the number of combustors arranged in the circumferential direction.

In this regard, with the above configuration (10), the first-stage stator vane is provided for each pair of combustors that are adjacent in the circumferential direction, and another first-stage stator vane is disposed between the pair of first-stage stator vanes that are adjacent in the circumferential direction. Thus, it is possible to ensure the number of stator vanes that form a stator vane row. Accordingly, while reducing the performance deterioration of a stator vane row, it is possible to reduce combustion vibration due to acoustic propagation between the outlet portions of the plurality of combustors while reducing thermal stress that occurs in the combustors during operation of the gas turbine, as described in the above (7).

(11) In some embodiments, in any one of the above configurations (7) to (10), the first-stage stator vane is disposed separately from the combustors, an intermediate member held between the first-stage stator vane and the pair of radial-directional wall portions or the recess portion or the protruding portion of the first-stage stator vane includes a wall surface which is parallel to an axial direction or which forms an angle of less than 45 angular degrees with the axial direction, and at least one of the pair of radial-directional wall portions overlaps with the wall surface in the axial direction.

With the above configuration (11), in the axial direction, the pair of radial-directional wall portions of the combustor outlet portions overlap with the wall surface of the first-stage stator vane or the intermediate member that is parallel to the axial direction or that forms an inclination angle of less than 45 angular degrees. Thus, even if the first-stage stator vane is relatively displaced mainly in the axial direction with respect to the combustors due to displacement of the relative positional relationship in the axial direction during operation of the gas turbine from the positional relationship intended at the time of design, for instance, it is possible to suppress an increase of the gap, in the circumferential direction, between the radial-directional wall portions and the first-stage stator vane or the intermediate member that brings the outlet portions of adjacent combustors into communication, and hinder acoustic propagation between the outlet portions of the plurality of combustors. Thus, it is possible to reduce combustion vibration due to acoustic propagation between the outlet portions of the plurality of combustors while reducing thermal stress that occurs in the combustors during operation of the gas turbine. Accordingly, the frequency of the combustion vibration that needs to be addressed decreases, and it is possible to operate the gas turbine stably.

(12) In some embodiments, in any one of the above configurations (7) to (11), the protruding portion of the first-stage stator vane is engaged with a protruding-portion receiving space formed by at least one of the pair of radial-directional wall portions.

With the above configuration (12), the protruding portion of the first-stage stator vane is engaged with the protruding-portion receiving space formed by at least one of the pair of radial-directional wall portions, and thereby at least one of the pair of radial-directional wall portions overlaps with the wall surface of the protruding portion of the first-stage stator vane in the axial direction. Thus, as described in the above (11), it is possible to reduce combustion vibration due to acoustic propagation between the outlet portions of the plurality of combustors while reducing thermal stress that occurs in the combustors during operation of the gas turbine.

(13) In some embodiments, in the above configuration (12), the protruding portion of the first-stage stator vane is engaged with the protruding-portion receiving space formed by half grooves disposed respectively on the pair of radial-directional wall portions.

With the above configuration (13), the protruding portion of the first-stage stator vane is engaged with the protruding-portion receiving space formed by half grooves formed respectively on the pair of radial-directional wall portions, and thereby each of the pair of radial-directional wall portions overlaps with the wall surface of the protruding portion of the first-stage stator vane in the axial direction. Thus, as described in the above (11), it is possible to reduce combustion vibration due to acoustic propagation between the outlet portions of the plurality of combustors while reducing thermal stress that occurs in the combustors during operation of the gas turbine.

(14) In some embodiments, in the above configuration (12), the protruding portion of the first-stage stator vane is engaged with the protruding-portion receiving space formed by a length difference in the axial direction of the pair of radial-directional wall portions.

With the above configuration (14), the protruding portion of the first-stage stator vane is engaged with the protruding-portion receiving space formed by the length difference of the pair of radial-directional wall portions in the axial direction, and thereby one of the pair of radial-directional wall portions overlaps with the wall surface of the protruding portion of the first-stage stator vane in the axial direction. Thus, as described in the above (11), it is possible to reduce combustion vibration due to acoustic propagation between the outlet portions of the plurality of combustors while reducing thermal stress that occurs in the combustors during operation of the gas turbine.

(15) In some embodiments, in any one of the above configurations (7) to (11), the gas turbine further includes an intermediate member disposed between the first-stage stator vane and the pair of radial-directional wall portions so as to be engaged with the intermediate-member receiving space formed by at least one of the pair of radial-directional wall portions.

With the above configuration (15), with the recess portion or the protruding portion of the first-stage stator vane being engaged with the intermediate member that is engaged with the intermediate member receiving space, the intermediate member overlaps with the wall surface of the recess portion or the protruding portion of the first-stage stator vane in the axial direction. Thus, as described in the above (11), it is possible to reduce combustion vibration due to acoustic propagation between the outlet portions of the plurality of combustors while reducing thermal stress that occurs in the combustors during operation of the gas turbine.

(16) In some embodiments, in any one of the above configurations (7) to (11), a projecting portion formed by at least one of the pair of radial-directional wall portions or an intermediate member held between the first-stage stator vane and the pair of radial-directional wall portions is engaged with the recess portion of the first-stage stator vane.

With the above configuration (16), with the recess portion of the first-stage stator vane being engaged with the projecting portion formed by at least one of the pair of radial-directional wall portions or the intermediate member, the projecting portion or the intermediate member overlaps with the wall surface of the recess portion of the first-stage stator vane in the axial direction. Thus, as described in the above (7), it is possible to reduce combustion vibration due to acoustic propagation between the outlet portions of the plurality of combustors while reducing thermal stress that occurs in the combustors during operation of the gas turbine.

(17) In some embodiments, in the above configuration (16), the projecting portion disposed on each of down-stream-side ends of the pair of radial-directional wall portions is engaged with the recess portion of the first-stage stator vane.

With the above configuration (17), with the recess portion of the first-stage stator vane being engaged with the projecting portion disposed on each of the downstream-side ends of the pair of radial-directional wall portions, the projecting portion overlaps with the wall surface of the recess portion of the first-stage stator vane in the axial direction. Thus, as described in the above (7), it is possible to reduce combustion vibration due to acoustic propagation between the outlet portions of the plurality of combustors while reducing thermal stress that occurs in the combustors during operation of the gas turbine.

(18) In some embodiments, in the above configuration (16), the pair of radial-directional wall portions include: a first radial-directional wall portion belonging to the outlet portion of a first combustor of the combustors adjacent to one another in the circumferential direction; and a second radial-directional wall portion belonging to the outlet portion of a second combustor of the combustors adjacent to one another in the circumferential direction, the second-directional wall portion extending to a downstream side of the first radial-directional wall portion in an axial direction. The recess portion of the first-stage stator vane is engaged with a downstream-side end of the second-radial-directional wall portion being the projecting portion.

With the above configuration (18), with the recess portion of the first-stage stator vane being engaged with the downstream-side end of the second radial-directional wall portion being the projecting portion, the projecting portion overlaps with the wall surface of the recess portion of the first-stage stator vane in the axial direction. Thus, as described in the above (7), it is possible to reduce combustion vibration due to acoustic propagation between the outlet portions of the plurality of combustors while reducing thermal stress that occurs in the combustors during operation of the gas turbine.

(19) In some embodiments, in any one of the above configurations (7) to (18), the gas turbine further includes a seal member held between the first-stage stator vane and the pair of radial-directional wall portions.

With the above configuration (19), with the seal member, it is possible to suppress acoustic propagation between the outlet portions of the plurality of combustors even more effectively.

(20) In some embodiments, in the above configuration (19), the second portion of the first-stage stator vane includes at least one of the recess portions, and each of the recess portions of the first-stage stator vane is engaged with the seal member.

With the above configuration (20), with the seal member held between the first-stage stator vane and the pair of radial-directional wall portions being engaged with the recess portion positioned at the leading-edge side of the first-stage stator vane, the effect of the seal member to suppress acoustic propagation improves, and it is possible to effectively reduce combustion vibration due to acoustic propagation between the outlet portions of the plurality of combustors.

Furthermore, even if the first-stage stator vane is relatively displaced in the axial direction with respect to the seal member due to displacement of the relative positional relationship in the axial direction during operation of the gas turbine from the positional relationship intended at the time of design, for instance, it is possible to suppress acoustic propagation between the outlet portions of the plurality of combustors even further, since the seal member is engaged with the recess portion of the first-stage stator vane and the side wall surface of the recess portion and the seal member overlap in the axial direction.

(21) In some embodiments, in the above configuration (20), the seal member includes a second end portion disposed opposite to a first end portion engaged with the recess portion of the first-stage stator vane, the second end portion being engaged with a seal receiving space formed by at least one of the pair of radial-directional wall portions.

With the above configuration (21), with the first end portion of the seal member being engaged with the recess portion of the first-stage stator vane and the second end portion of the seal member being engaged with the seal receiving space formed by the pair of radial-directional wall portions, the effect of the seal member to suppress acoustic propagation improves, and it is possible to effectively reduce combustion vibration due to acoustic propagation between the outlet portions of the plurality of combustors.

Furthermore, even if the seal member is relatively displaced in the axial direction with respect to the radial-directional wall portions of the combustors due to displacement of the relative positional relationship in the axial direction during operation of the gas turbine from the positional relationship intended at the time of design, for instance, it is possible to suppress acoustic propagation between the outlet portions of the plurality of combustors even further, since the seal member is engaged with the seal receiving space of the combustor and the side wall surface of the seal receiving space and the seal member overlap in the axial direction.

(22) In some embodiments, in the above configuration (21), the second end portion of the seal member is engaged with the seal receiving space formed by half grooves disposed respectively on the pair of radial-directional wall portions.

With the above configuration (22), with the first end portion of the seal member being engaged with the recess portion of the first-stage stator vane and the second end portion of the seal member being engaged with the seal receiving space formed by half grooves disposed respectively on the pair of radial-directional wall portions, the effect of the seal member to suppress acoustic propagation improves, and it is possible to effectively reduce combustion vibration due to acoustic propagation between the outlet portions of the plurality of combustors.

Furthermore, even if the seal member is relatively displaced in the axial direction with respect to the radial-directional wall portions of the combustors due to displacement of the relative positional relationship in the axial direction during operation of the gas turbine from the positional relationship intended at the time of design, for instance, it is possible to suppress acoustic propagation between the outlet portions of the plurality of combustors even further, since the seal member is engaged with the seal receiving space of the combustor and the side wall surface of the seal receiving space and the seal member overlap in the axial direction.

(23) In some embodiments, in the above configuration (21), the second end portion of the seal member is engaged with the seal receiving space formed by a groove formed on one of the pair of radial-directional wall portions.

With the above configuration (23), the first end portion of the seal member is engaged with the recess portion of the first-stage stator vane and the second end portion of the seal member is engaged with the seal receiving space formed by a groove disposed on at least one of the pair of radial-directional wall portions. Thus, the effect of the seal member to suppress acoustic propagation improves, and it is possible to effectively reduce combustion vibration due to acoustic propagation between the outlet portions of the plurality of combustors.

Furthermore, even if the seal member is relatively displaced in the axial direction with respect to the radial-directional wall portions of the combustors due to displacement of the relative positional relationship in the axial direction during operation of the gas turbine from the positional relationship intended at the time of design, for instance, it is possible to suppress acoustic propagation between the outlet portions of the plurality of combustors even further, since the seal member is engaged with the seal receiving space of the combustor and the side wall surface of the seal receiving space and the seal member overlap in the axial direction.

(24) In some embodiments, in any one of the above configurations (19) to (23), the seal member includes metal cloth.

With the above configuration (24), with the seal member having a simplified configuration using metal cloth, it is possible to implement the configurations (19) to (23).

(25) In some embodiments, in the above configuration (19), the seal member is disposed inside a seal receiving space formed by at least one of the pair of radial-directional wall portions so as to divide the seal receiving space into an upstream-side chamber and a downstream-side chamber, the first-stage stator vane includes an upstream-side end portion including a protruding portion, and the protruding portion of the first-stage stator vane is inserted at least partially into the downstream-side chamber of the seal receiving space so as to be in slidable contact with the seal member.

With the above configuration (25), the protruding portion of the first-stage stator vane is inserted at least partially into the seal receiving space formed by the pair of radial-directional wall portions so as to be in slidable contact with the seal member disposed in the seal receiving space, and thus the pair of side wall surfaces of the protruding portion of the first-stage stator vane and the seal member overlap in the axial direction. Thus, as described in the above (19), it is possible to reduce combustion vibration due to acoustic propagation between the outlet portions of the plurality of combustors while reducing thermal stress that occurs in the combustors during operation of the gas turbine.

(26) In some embodiments, in the above configuration (25), the seal member has a protruding-portion receiving space to receive the protruding portion of the first-stage stator vane, and the protruding portion of the first-stage stator vane is configured to be slidable in an axial direction relative to the seal member in the protruding-portion receiving space of the seal member.

With the above configuration (26), the protruding portion of the first-stage stator vane is slidable with respect to the seal member inside the protruding-portion receiving space of the seal member, and thereby the relative displacement of the first-stage stator vane relative to the seal member in the axial direction, that is, the relative displacement of the first-stage stator vane relative to the combustor becomes more allowable. Thus, it is possible to effectively reduce thermal stress that occurs in the combustors during operation of the gas turbine.

(27) In some embodiments, in the above configuration (26), the seal member includes: a slide portion forming the protruding-portion receiving space and being configured to be slidable in the axial direction relative to the protruding portion of the first-stage stator vane; and a pair of flange portions disposed protruding in the circumferential direction from a downstream-side end of the slide portion so as to be positioned on either side of the protruding portion of the first-stage stator vane in the circumferential direction. The pair of radial-directional wall portions each include a limiting portion for limiting downstream movement of the seal member, the limiting portion being positioned downstream of the pair of flange portions of the seal member.

With the above configuration (27), the slide portion of the seal member is slidable in the axial direction relative to the protruding portion of the first-stage stator vane, and downstream movement of the flange portions of the seal member is limited by the limiting portions of the radial-directional wall portions. Accordingly, it is possible to prevent the seal member from falling off from the combustor while allowing relative displacement of the first-stage stator vane relative to the seal member in the axial direction, that is, relative displacement of the first-stage stator vane relative to the combustor.

(28) In some embodiments, in the above configuration (26), the seal member includes: a plate spring portion having a pinch portion which forms the protruding-portion receiving space and which pinches the protruding portion; and a pair of leg portions disposed at a distance from one another in the circumferential direction toward a downstream side from the pinch portion of the plate spring portion, so as to be positioned on either side of the protruding portion of the first-stage stator vane in the circumferential direction. The pair of radial-directional wall portions each include a limiting portion for limiting downstream movement of the seal member, the limiting portion being positioned downstream of the pair of leg portions of the seal member.

With the above configuration (28), the protruding portion of the first-stage stator vane is pinched by the pinch portion of the seal member, and is movable inside the protruding-portion receiving space in the axial direction, while downstream movement of the seal member is limited by the limiting portion. Accordingly, it is possible to prevent the seal member from falling off from the combustor while allowing relative displacement of the first-stage stator vane relative to the seal member in the axial direction, that is, relative displacement of the first-stage stator vane relative to the combustor.

(29) In some embodiments, in the above configuration (19), the first-stage stator vane includes an upstream-side end portion including a protruding portion, the protruding portion of the first-stage stator vane is engaged with a protruding-portion receiving space formed by the pair of radial-directional wall portions, and the seal member is disposed between the protruding portion and a wall surface along an axial direction of the pair of radial-directional wall portions forming the protruding-portion receiving space.

With the above configuration (29), the seal member is disposed between the protruding portion of the first-stage stator vane and the wall surface along the axial direction of the pair of radial-directional wall portions forming the protruding-portion receiving space, and thus it is possible to suppress an increase in the gap in the circumferential direction between the radial-directional wall portions and the protruding portion of the first-stage stator vane or the seal member, and hinder acoustic propagation between the outlet portions of the plurality of combustors. Accordingly, it is possible to reduce combustion vibration due to acoustic propagation between the outlet portions of the plurality of combustors effectively.

(30) In some embodiments, in the above configuration (29), the seal member includes a wire seal fixed to the wall surface along the axial direction of the pair of radial-directional wall portions or a wall surface of the protruding portion facing the wall surface.

With the above configuration (30), with the simplified configuration that uses the wire seals fixed to the wall surfaces along the axial direction of the pair of radial-directional wall portions or the wall surface of the protruding portion of the first-stage stator vane facing the wall surfaces, it is possible to suppress an increase in the gap in the circumferential direction between the radial-directional wall portions and the protruding portion of the first-stage stator vane or the seal member, and hinder acoustic propagation between the outlet portions of the plurality of combustors.

(31) In some embodiments, in the above configuration (29), the seal member includes a gasket fixed to the wall surface along the axial direction of the pair of radial-directional wall portions or a wall surface of the protruding portion facing the wall surface.

With the above configuration (31), with the simplified configuration that uses the wire gasket fixed to the wall surfaces along the axial direction of the pair of radial-directional wall portions or the wall surface of the protruding portion of the first-stage stator vane facing the wall surfaces, it is possible to suppress an increase in the gap in the circumferential direction between the radial-directional wall portions and the protruding portion of the first-stage stator vane or the seal member, and hinder acoustic propagation between the outlet portions of the plurality of combustors.

(32) According to at least one embodiment of the present invention, a stator vane unit for a gas turbine includes: the at least one first-stage stator vane according to any one of the above (1) to (6); and a shroud disposed on at least one of a radially inner side or a radially outer side of the first-stage stator vane, the second portion of the first-stage stator vane extends to a position of an upstream-side end surface of the shroud in an axial direction, and the first-stage stator vane includes a flat portion disposed next to the recess portion or the protruding portion in a circumferential direction, the flat portion forming a flat surface continuing to the upstream-side end surface of the shroud.

With the above configuration (32), when the recess portion or the protruding portion positioned at the leading-edge side of the first-stage stator vane is engaged with a combustor-side counterpart member (e.g. the combustor itself or a member disposed between the combustor and the first-stage stator vane), it is possible to cause a pair of side wall surfaces of the recess portion or the protruding portion of the first-stage stator vane to overlap with the counterpart member in the axial direction. Furthermore, with the angle formed between the pair of side wall surfaces of the recess portion or the protruding portion of the first-stage stator vane being less than 90 angular degrees, even if the first-stage stator vane is relatively displaced mainly in the axial direction with respect to the combustors due to displacement of the relative positional relationship during operation of the gas turbine from the positional relationship intended at the time of design, for instance, it is possible to suppress an increase in the gap, in the circumferential direction, between the pair of side wall surfaces of the recess portion or the protruding portion of the first-stage stator vane and the counterpart member that brings the outlet portions of adjacent combustors into communication. Accordingly, it is possible to hinder acoustic propagation between the outlet portions of the plurality of combustors. Thus, it is possible to reduce combustion vibration due to acoustic propagation between the outlet portions of the plurality of combustors while reducing thermal stress that occurs in the combustors during operation of the gas turbine. Accordingly, the frequency of the combustion vibration that needs to be addressed decreases, and it is possible to operate the gas turbine stably.

Furthermore, with the above configuration (32), with the flat portion that forms the flat surface continuing to the upstream-side end surface of the shroud being disposed next to the recess portion or the protruding portion of the second portion of the first-stage stator vane, an acoustic propagation path formed between the recess portion or the protruding portion of the first-stage stator vane and the counterpart member has a bend shape formed by the flat surface and the side wall surfaces of the recess portion or the protruding portion of the first-stage stator vane. Accordingly, it is possible to suppress acoustic propagation between the outlet portions of the plurality of combustors effectively. Furthermore, the connection surface disposed between the above described flat surface and the surface of the airfoil has a trailing edge side end continuously connected to the surface of the airfoil, and thus the flow of combustion gas is less likely to cause turbulence compared to a case where the flat surface and the surface of the airfoil are not connected continuously. Accordingly, it is possible to reduce fluid loss in the gas turbine.

(33) In some embodiments, in the above configuration (32), an upstream-side end portion of the first-stage stator vane includes at least one cooling hole having a first end and a second end, the first end having an opening into a cooling passage formed inside the first-stage stator vane and the second end having an opening on an outer surface of the recess portion or the protruding portion or the flat surface.

With the above configuration (33), it is possible to supply a cooling fluid from the cooling passage to the gap between the outer surface or the flat surface of the recess portion or the protruding portion of the first-stage stator vane and the counterpart member that the outer surface or the flat surface faces, via the cooling hole disposed on the upstream-side end portion of the first-stage stator vane. With the flow of the cooling fluid supplied to the gap or the like between the first-stage stator vane and the counterpart member, it is possible to suppress acoustic propagation between the outlet portions of the combustor via the gap, while cooling the first-stage stator vane. Accordingly, it is possible to effectively reduce combustion vibration due to acoustic propagation between the outlet portions of the plurality of combustors.

(34) According to at least one embodiment of the present invention, a gas turbine includes: a plurality of combustors disposed in a circumferential direction, each of the plurality of combustors having an outlet portion including a radial-directional wall portion along a radial direction; and at least one first-stage stator vane positioned downstream of a pair of the radial-directional wall portions facing one another of the outlet portions of the combustors adjacent to one another in the circumferential direction, the at least one first-stage stator being provided separately from the combustors. The pair of radial-directional wall portions overlap with an upstream-side portion of the first-stage stator vane or an intermediate member held between the first-stage stator vane and the pair of radial-directional wall portions in an axial direction, and the first-stage stator vane includes at least one cooling hole having a first end and a second end, the first end having an opening into a cooling passage formed inside the first-stage stator vane and the second end having an opening on an outer surface of the upstream-side portion.

With the above configuration (34), in the axial direction, the pair of radial-directional wall portions overlap with the intermediate member held between the first-stage stator vane and the pair of radial-directional wall portions or the upstream-side portion of the first-stage stator vane. Thus, even if the first-stage stator vane is relatively displaced mainly in the axial direction with respect to the combustors due to displacement of the relative positional relationship in the axial direction during operation of the gas turbine from the positional relationship intended at the time of design, for instance, it is possible to suppress an increase of the gap, in the circumferential direction, between the radial-directional wall portions and the first-stage stator vane or the intermediate member that brings the outlet portions of adjacent combustors into communication, and hinder acoustic propagation between the outlet portions of the plurality of combustors. Thus, it is possible to reduce combustion vibration due to acoustic propagation between the outlet portions of the plurality of combustors while reducing thermal stress that occurs in the combustors during operation of the gas turbine. Accordingly, the frequency of the combustion vibration that needs to be addressed decreases, and it is possible to operate the gas turbine stably.

Furthermore, with the above configuration (34), it is possible to supply the cooling fluid from the cooling passage toward the outer surface of the upstream-side portion of the first-stage stator vane via the cooling hole. Accordingly, it is possible to cool the first-stage stator vane effectively.

(35) According to at least one embodiment of the present invention, a gas turbine includes: a plurality of combustors disposed in a circumferential direction, each of the plurality of combustors having an outlet portion including a radial-directional wall portion along a radial direction; and at least one first-stage stator vane positioned downstream of the pair of radial-directional wall portions facing one another of the outlet portions of the combustors adjacent to one another in the circumferential direction, the at least one first-stage stator vane being provided separately from the combustors. The first-stage stator vane includes an upstream-side end portion including a recess portion, and at least one of the pair of radial-directional wall portions or an intermediate member held between the first-stage stator vane and the pair of radial-directional wall portions is engaged with the recess portion of the first-stage stator vane.

With the above configuration (35), the recess portion disposed on the upstream-side end portion of the first-stage stator vane is engaged with at least one of the pair of radial-directional wall portions or the intermediate member, and thus it is possible to cause the recess portion of the first-stage stator vane to overlap with at least one of the pair of radial-directional wall portions or the intermediate member in the axial direction.

Thus, even if the first-stage stator vane is relatively displaced mainly in the axial direction with respect to the combustors due to displacement of the relative positional relationship in the axial direction during operation of the gas turbine from the positional relationship intended at the time of design, for instance, it is possible to suppress an increase of the gap, in the circumferential direction, between the recess portion of the first-stage stator vane and at least one of the radial-directional wall portions or the intermediate member that brings the outlet portions of adjacent combustors into communication, and hinder acoustic propagation between the outlet portions of the plurality of combustors. Thus, it is possible to reduce combustion vibration due to acoustic propagation between the outlet portions of the plurality of combustors while reducing thermal stress that occurs in the combustors during operation of the gas turbine. Accordingly, the frequency of the combustion vibration that needs to be addressed decreases, and it is possible to operate the gas turbine stably.

(36) According to at least one embodiment of the present invention, a combustor assembly includes; a plurality of combustors disposed in a circumferential direction, each of the plurality of combustors having an outlet portion which includes a radial-directional wall portion along a radial direction and a circumferential-directional wall portion along a circumferential direction, positions of downstream-side ends of the radial-directional wall portion and the circumferential-directional wall portion are aligned in an axial direction, and a groove extending along the radial direction is formed on a downstream-side end of at least one of a pair of the radial-directional wall portions which face one another of the outlet portions of the combustors adjacent to one another in the circumferential direction.

With the above configuration (36), when the groove formed on the downstream-side end of at least one of the pair of radial-directional wall portions is engaged with the a stator-vane side counterpart member (e.g. the first-stage stator vane itself or a member disposed between the first-stage stator vane and the radial-directional wall portion), it is possible to cause the wall surface forming the groove to overlap with the counterpart member in the axial direction.

Thus, even if the first-stage stator vane is relatively displaced mainly in the axial direction with respect to the combustors due to displacement of the relative positional relationship in the axial direction during operation of the gas turbine from the positional relationship intended at the time of design, for instance, it is possible to suppress an increase of the gap, in the circumferential direction, between the groove on the radial-directional wall portion and the first-stage stator vane that brings the outlet portions of adjacent combustors into communication, and hinder acoustic propagation between the outlet portions of the plurality of combustors. Thus, it is possible to reduce combustion vibration due to acoustic propagation between the outlet portions of the plurality of combustors while reducing thermal stress that occurs in the combustors during operation of the gas turbine. Accordingly, the frequency of the combustion vibration that needs to be addressed decreases, and it is possible to operate the gas turbine stably.

Advantageous Effects

According to an embodiment of the present invention, it is possible to provide a first-stage stator vane for a gas turbine, a gas turbine, a stator vane unit for a gas turbine, and a combustor assembly, capable of reducing combustion vibration that is caused by acoustic propagation between the outlet portions of the plurality of combustors, while reducing thermal stress that occurs in the combustors.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
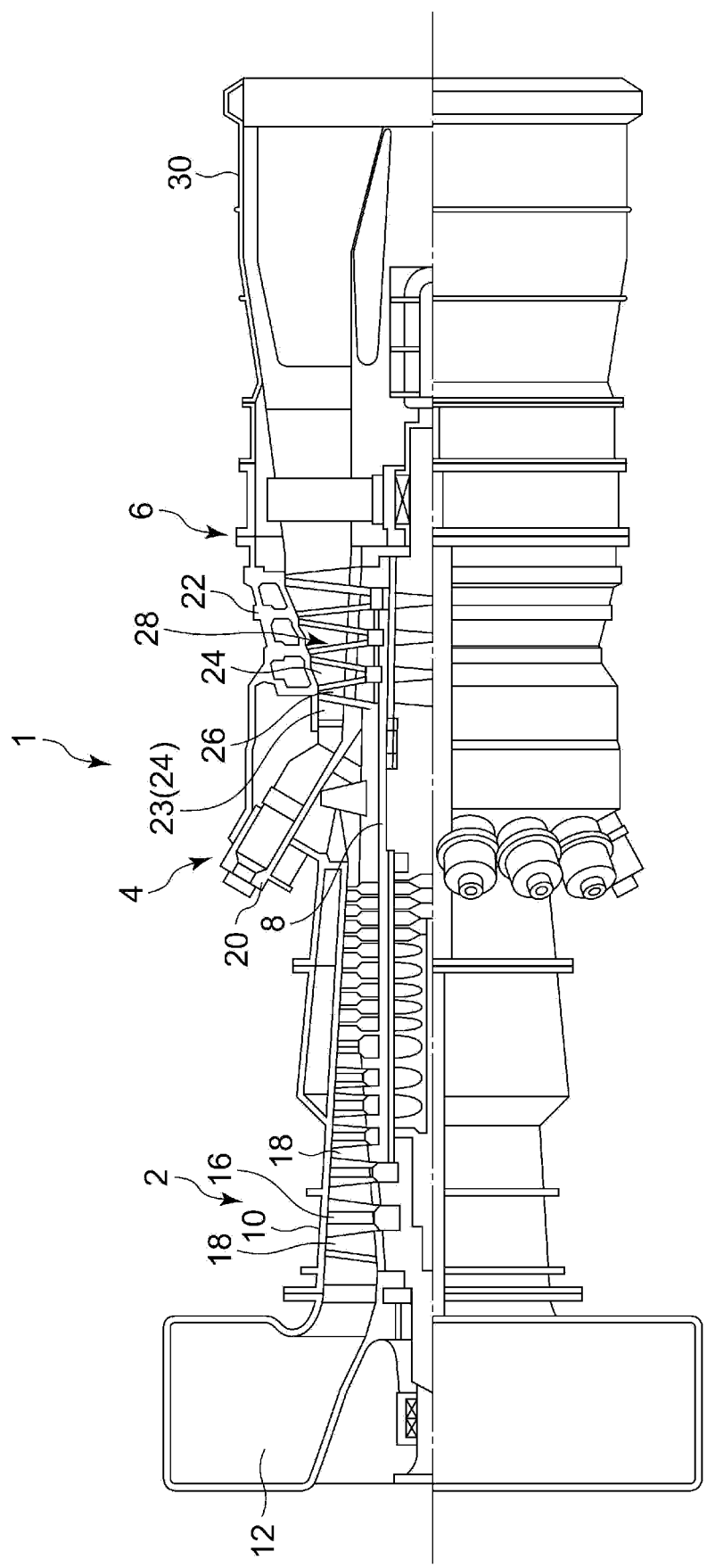
FIG. 1 is a schematic configuration diagram of a gas turbine according to an embodiment.

FIG. 1 is a schematic configuration diagram of a gas turbine according to an embodiment.

As depicted in FIG. 1, the gas turbine 1 includes a compressor 2 for producing compressed air, a combustor 4 for producing combustion gas from the compressed air and fuel, and a turbine 6 configured to be rotary driven by combustion gas. In the case of the gas turbine 1 for power generation, a generator (not illustrated) is connected to the turbine 6.

The compressor 2 includes a plurality of stator vanes 16 fixed to the side of the compressor casing 10 and a plurality of rotor blades 18 implanted on the rotor 8 so as to be arranged alternately with the stator vanes 16.

The compressor 2 is supplied with air taken in from an air inlet 12, and the air flows through the plurality of stator vanes 16 and the plurality of rotor blades 18 to be compressed, and the air is turned into compressed air having a high temperature and a high pressure.

The combustor 4 is supplied with fuel and the compressed air produced in the compressor 2, and combusts the fuel to produce combustion gas that serves as a working fluid of the turbine 6. As depicted in FIG. 1, the gas turbine 1 includes a plurality of combustors 4 arranged along the circumferential direction around the rotor inside the casing 20.

The turbine 6 has a combustion gas flow passage 28 formed by the turbine casing 22, and includes a plurality of stator vanes 24 and a plurality of rotor blades 26 disposed in the combustion gas flow passage 28.

The stator vanes 24 are fixed to the side of the turbine casing 22, and a plurality of stator vanes 24 arranged along the circumferential direction of the rotor 8 form a stator vane row. Furthermore, the rotor blades 26 are implanted on the rotor 8, and a plurality of rotor blades 26 arranged along the circumferential direction of the rotor 8 form a rotor blade row. The rotor blade rows and the stator vane rows are arranged alternately in the axial direction of the rotor 8. Further, of the plurality of stator vanes 24, the most upstream stator vane 24 (i.e. stator vane 24 that is close to the combustor 4) is the first-stage stator vane 23.

In the turbine 6, the rotor 8 is rotary driven by combustion gas from the combustors 4 flowing into the combustion gas flow passage 28 and passing through the plurality of stator vanes 24 and the plurality of rotor blades 26, and thereby a generator coupled to the rotor 8 is driven and electric power is generated. The combustion gas having driven the turbine 6 is discharged outside via an exhaust chamber 30.

Figure 2:
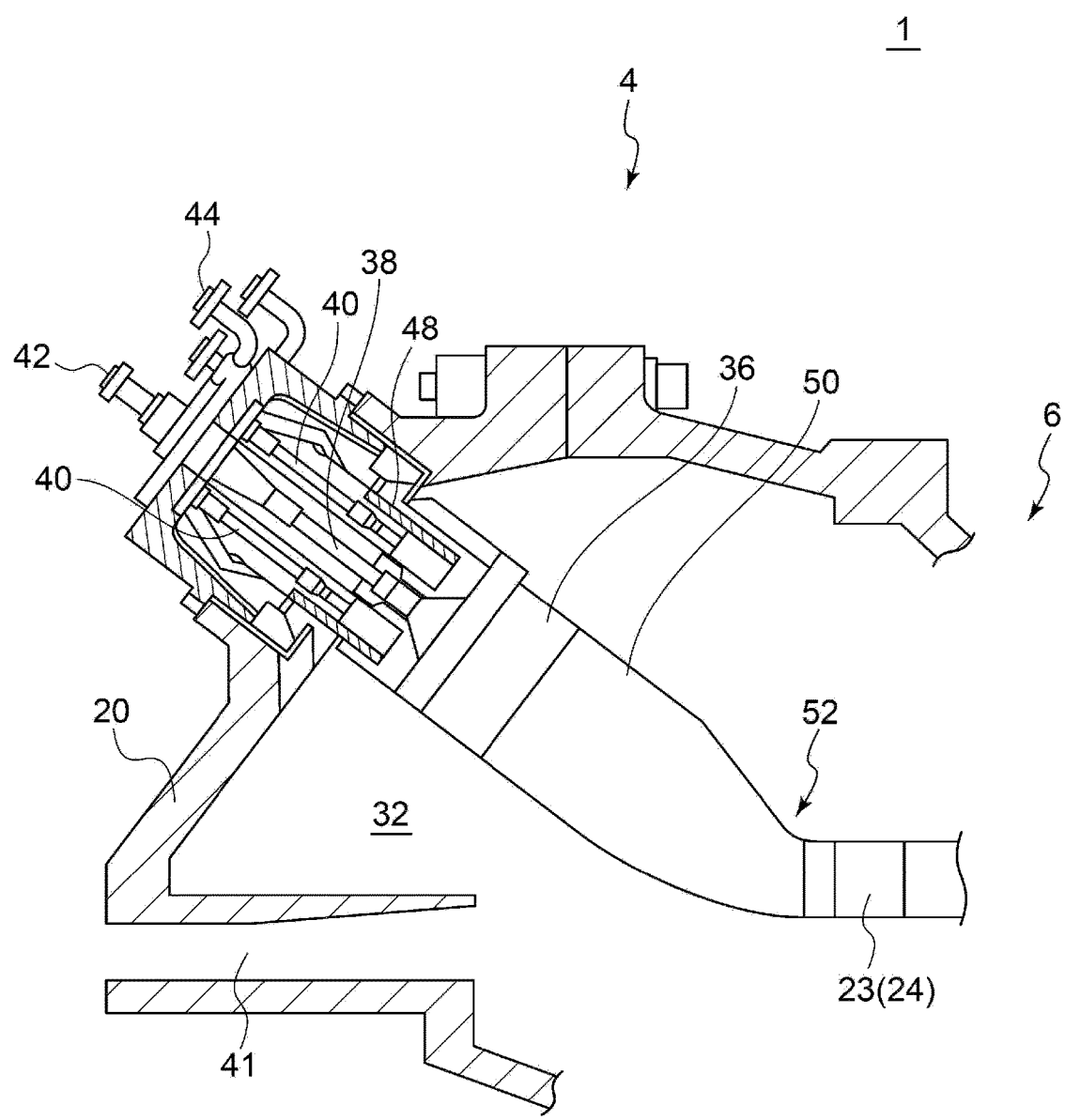
FIG. 2 is a schematic configuration diagram of a combustor 4 of a gas turbine and an inlet portion of a turbine according to an embodiment.

FIG. 2 is a schematic configuration diagram of the combustor 4 for the gas turbine 1 and the inlet portion of the turbine 6 according to an embodiment.

As depicted in FIG. 2, a plurality of combustors 4 are arranged in an annular shape around the rotor 8 (see FIG. 1), and each combustor 4 includes a combustor liner 36 disposed in a combustor casing 32 defined by the casing 20, a first combustion burner 38 disposed in each combustor liner 36, and a plurality of second combustion burners 40 disposed so as to surround the first combustion burner 38. The combustor 4 may include other constituent elements such as a bypass line (not illustrated) for allowing the combustion gas to bypass.

The combustor liner 36 includes a combustor basket 48 disposed around the first combustion burner 38 and the plurality of second combustion burners 40, and a transition piece 50 connected to the tip portion of the combustor basket 48. The combustor basket 48 and the transition piece 50 may form an integrated combustion liner.

The first combustion burner 38 and the second combustion burner 40 each include a fuel nozzle (not depicted) for injecting fuel and a burner cylinder (not depicted) disposed so as to surround the fuel nozzle. Each fuel nozzle is supplied with fuel via each of fuel ports 42, 44. Further, compressed air produced in the compressor 2 (see FIG. 1) is supplied into the combustor casing 32 via a casing inlet 41, and flows into each of non-depicted burner cylinders from the combustor casing 32. In each burner cylinder of the first combustion burner 38 and the second combustion burner 40, fuel injected from the fuel nozzle and compressed air are mixed, and the gas mixture flows into the combustor liner 36 to be ignited and combusted. Accordingly, combustion gas is produced.

Furthermore, the first combustion burner 38 may be a burner for generating diffusion combustion flame, and the second combustion burner 40 may be a burner for combusting pre-mixed gas and generating pre-mixed combustion flame.

That is, in the second combustion burner 40, fuel from the fuel port 44 and compressed air are pre-mixed, and the pre-mixed gas mainly forms a swirl flow with a swirler (not depicted), and flows into the combustor liner 36. Further, the compressed air and fuel injected from the first combustion burner 38 via the fuel port 42 are mixed in the combustor liner 36, and ignited by a pilot light (not illustrated) to be combusted, whereby combustion gas is generated. At this time, a part of the combustion gas diffuses out with flames, which ignites the premixed gas flowing into the combustor liner 36 from each of the second combustion burners 40 to cause combustion. That is, the diffusion combustion flame caused by the diffusion combustion fuel injected from the first combustion burner 38 can hold flames for performing stable combustion of premixed gas (premixed fuel) from the second combustion burners 40. At this time, the combustion region is formed inside the combustor basket 48 for instance, and may not necessarily formed in the transition piece 50.

The combustion gas produced through combustion of fuel in the combustor 4 as described above flows into the first-stage stator vane 23 of the turbine 6 via the outlet portion 52 of the combustor 4 positioned at the downstream end portion of the transition piece 50.

Figure 3:
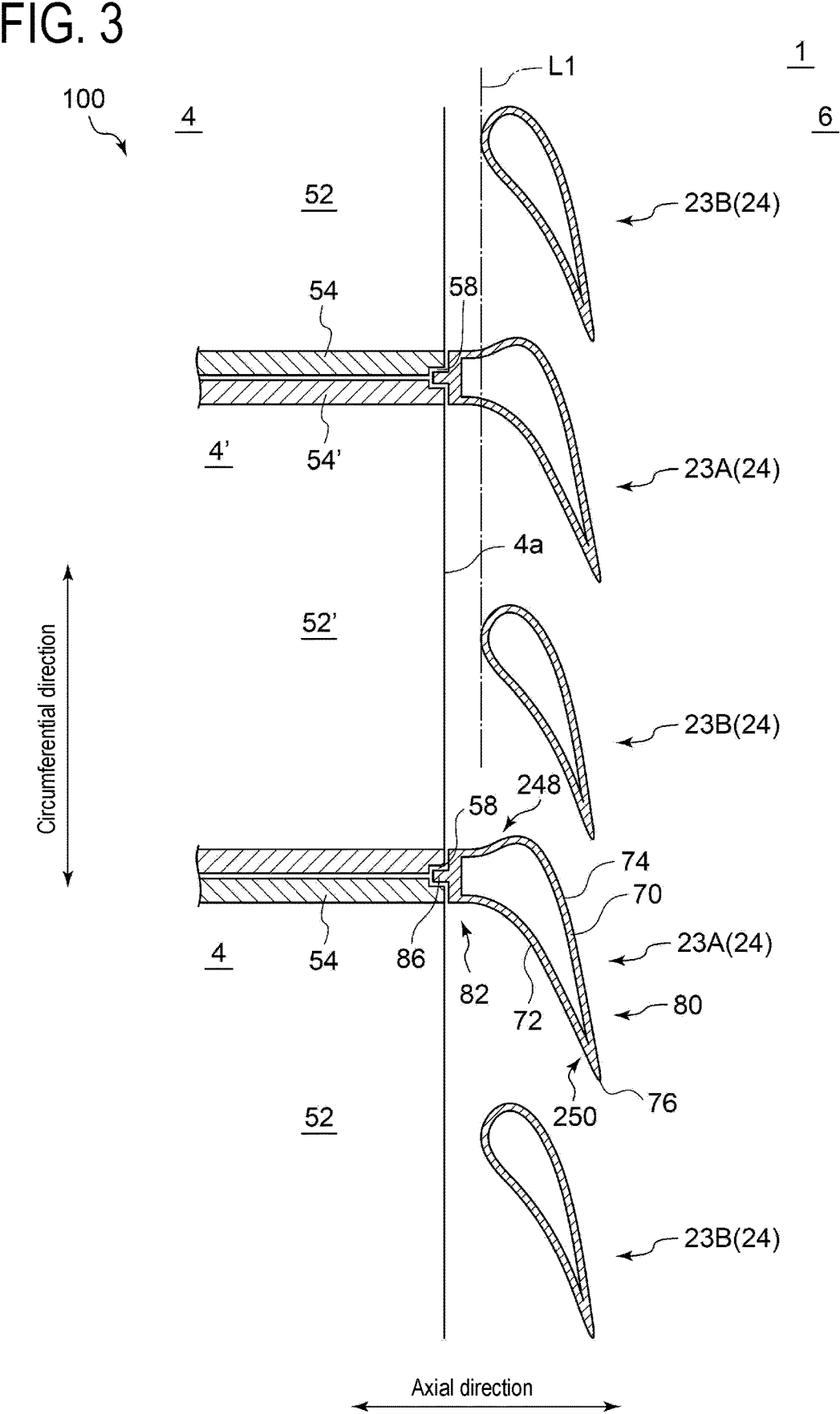
FIG. 3 is a schematic configuration diagram of an outlet portion of a combustor of a gas turbine and an inlet portion of the turbine.
Figure 4:
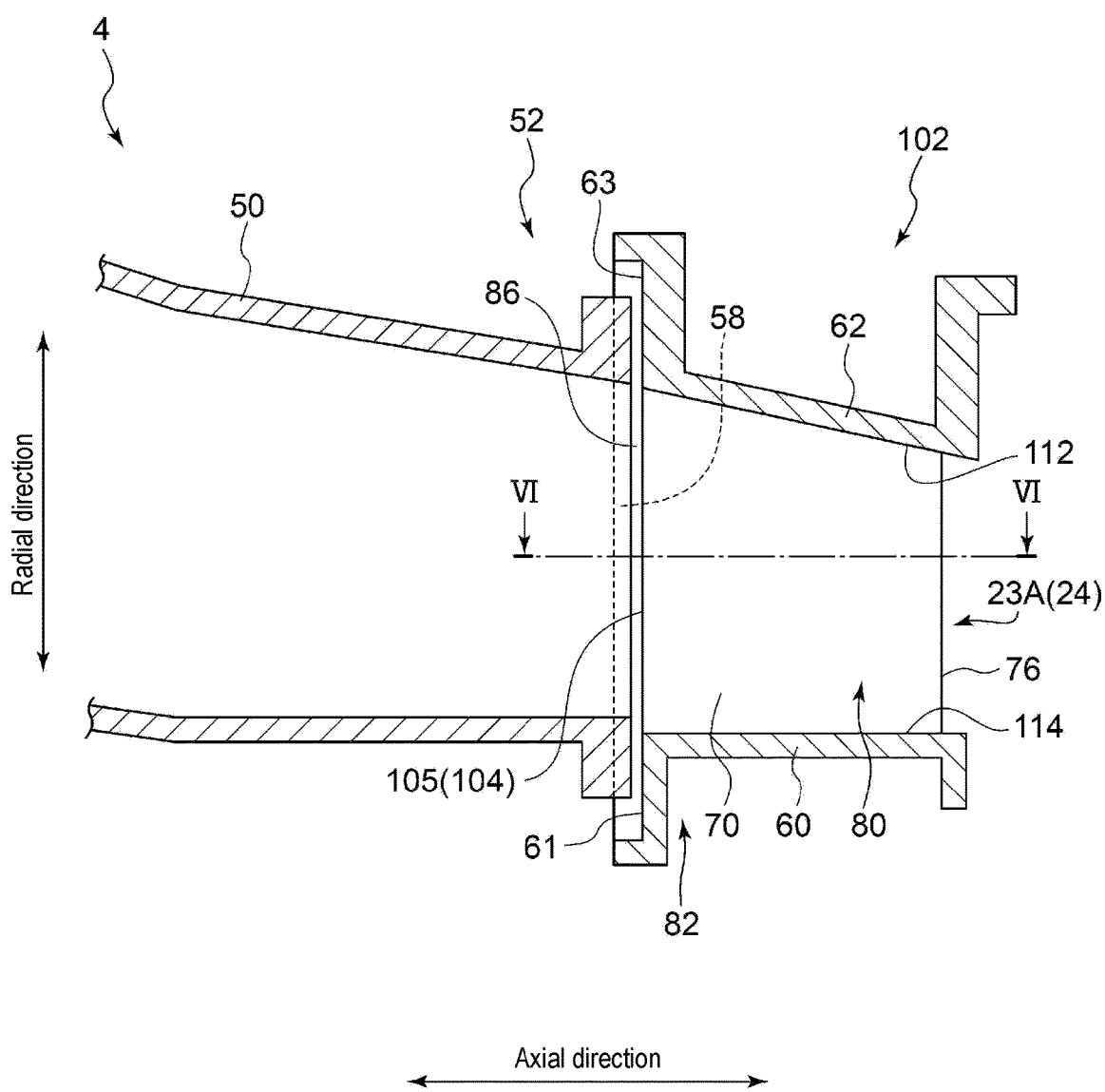
FIG. 4 is a schematic configuration diagram of an outlet portion of a combustor of a gas turbine and an inlet portion of the turbine.

FIGS. 3 and 4 are each a schematic configuration diagram of the outlet portion 52 of the combustor 4 of the gas turbine 1 and the inlet portion of the turbine 6 according to an embodiment. Of the drawings, FIG. 3 is a cross-sectional view taken along the circumferential direction and FIG. 4 a cross-sectional view taken along the radial direction.

Figure 5:
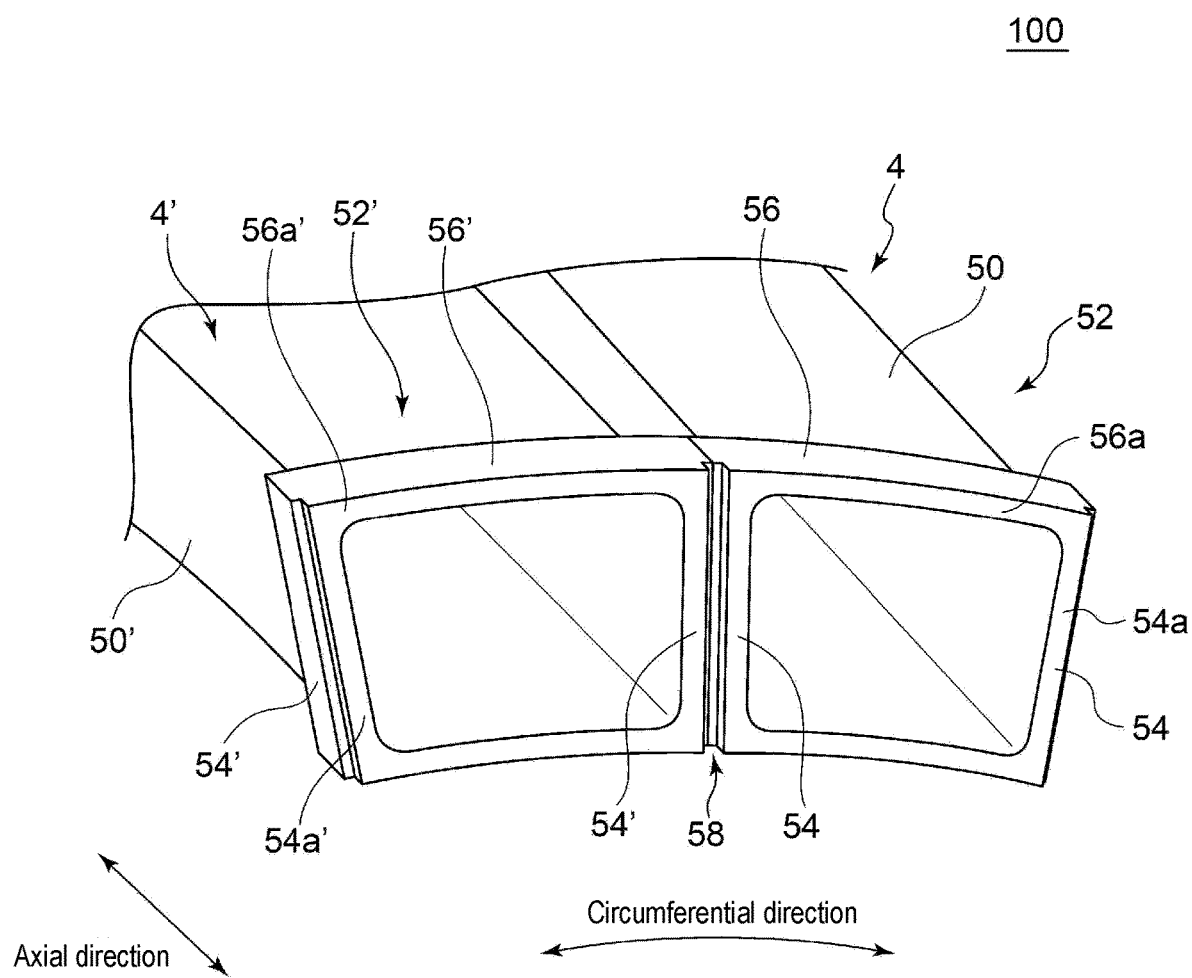
FIG. 5 is a configuration diagram of an outlet portion of a combustor according to an embodiment.

FIG. 5 is a configuration diagram of the outlet portion 52 of the combustor 4 (combustor assembly 100) according to an embodiment. In FIG. 5, adjacent two combustors are depicted, from among the plurality of combustors 4 arranged in the circumferential direction.

Figure 6:
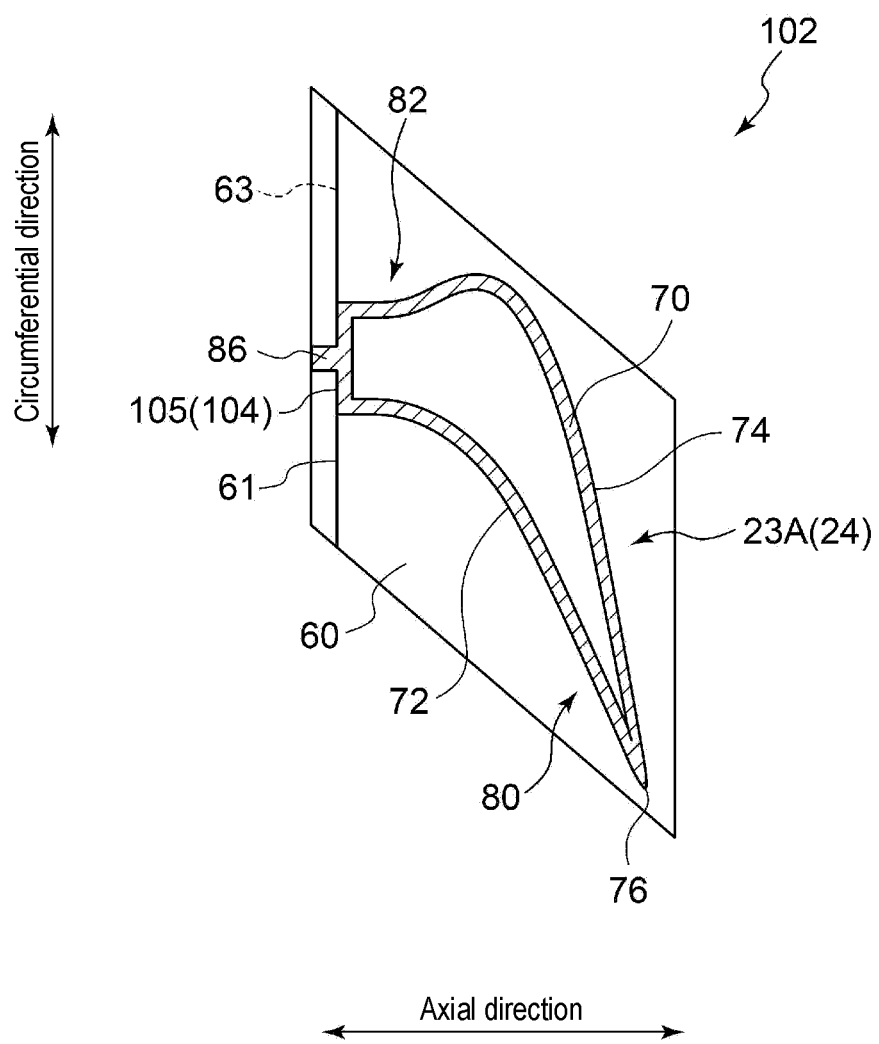
FIG. 6 is a cross-sectional view of a first-stage stator vane according to an embodiment (VI-VI cross-sectional view shown in FIG. 4).

FIG. 6 is a cross-sectional view of the first-stage stator vane 23 according to an embodiment (VI-VI cross-sectional view shown in FIG. 4).

As depicted in FIGS. 3 and 4, the gas turbine 1 includes a plurality of combustors 4 arranged in the circumferential direction and a first-stage stator vane 23 positioned downstream of the outlet portions 5 of the combustors 4. That is, the combustors 4 and the first-stage stator vane 23 are provided separately.

The plurality of combustors 4 arranged in the circumferential direction form a combustor assembly 100 according to some embodiments. As depicted in FIGS. 3 to 5, the plurality of combustors 4 each have an outlet portion 52 positioned on the downstream end portion of the combustor 4, and the outlet portion 52 of each combustor 4 includes radial-directional wall portions 54, 54' that extend along the radial direction and a circumferential-directional wall portion 56 that extends along the circumferential direction. Herein, of the outlet portions 52 of the combustors 4 that are adjacent to one another in the circumferential direction, the radial-directional wall portion 54 of one of the combustors 4 and the radial-directional wall portion 54' of the other one of the combustors 4 are a pair of radial-directional wall portions 54, 54' that face each other (see FIGS. 3 and 5).

As depicted in FIG. 3, a plurality of first-stage stator vanes 23 arranged along the circumferential direction include a first-stage stator vane 23A disposed downstream of the above described pair of radial-directional wall portions 54, 54'.

In some embodiments, as depicted in FIG. 3, the plurality of first-stage stator vanes 23 further include a second first-stage stator vane 23B disposed at a circumferential-directional position between the pair of first-stage stator vanes 23A, 23A that are adjacent in the circumferential direction.

As depicted in FIG. 3, the first-stage stator vane 23A extends to the upstream side of the leading edge of the second first-stage stator vane 23B. In FIG. 3, the position of the leading edge in the axial direction of the second first-stage stator vane 23B is indicated by a single-dot chain line L1.

In the illustrative embodiment depicted in FIG. 3, the plurality of first-stage stator vanes 23 arranged along the circumferential direction include the first-stage stator vane 23A and the second first-stage stator vane 23B arranged alternately in the circumferential direction.

In some embodiments, the first-stage stator vane 23A constitutes a stator vane unit 102 together with an inner shroud 60 and an outer shroud 62.

As depicted in FIGS. 4 and 6, the stator vane unit 102 includes the first-stage stator vane 23A, the inner shroud 60 disposed at the radially inner side of the first-stage stator vane 23A, and the outer shroud 62 disposed at the radially outer side of the first-stage stator vane 23A.

The outer shroud 62 is supported on the turbine casing 22 (see FIG. 1), and the first-stage stator vane 23 is supported on the turbine casing 22 via the outer shroud 62.

In some embodiments, as depicted in FIGS. 3, 4, and 6, the first-stage stator vane 23A of the gas turbine 1 includes a first portion 80 that partially forms an airfoil 70 including a pressure surface 72, a suction surface 74, and a trailing edge 76, and a second portion 82 positioned at the side of the leading edge 78 of the airfoil 70 with respect to the first portion 80.

Figure 7:
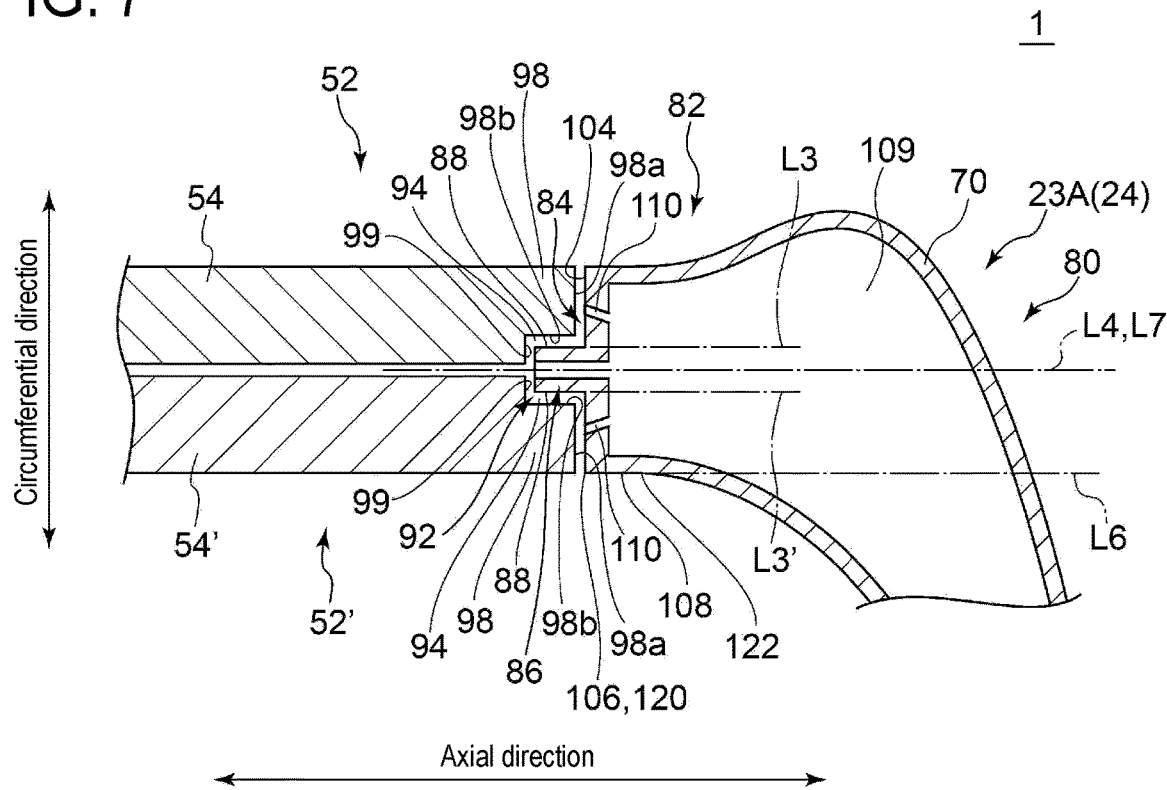
FIG. 7 is a cross-sectional view of a pair of radial-directional wall portions and the first-stage stator vane according to an embodiment, taken along the circumferential direction.

FIGS. 7 to 11 are each a cross-sectional view of the pair of radial-directional wall portions 54, 54' and the first-stage stator vane 23A of a gas turbine 1 according to an embodiment, taken along the circumferential direction. FIG. 7 is an enlarged partial view of FIG. 3.

In some embodiments, as depicted in FIGS. 3, 4, and 6 to 11, the second portion 82 of the first-stage stator vane 23A has a recess portion 84 and a protruding portion 86. The recess portion 84 of the first-stage stator vane 23A may have a recessed shape in the axial direction. Furthermore, the protruding portion 86 of the first-stage stator vane 23A may have a protruding shape in the axial direction.

Furthermore, at least one of the pair of radial-directional wall portions 54, 54' of the combustors 4 overlaps with the recess portion 84 or the protruding portion 86 of the first-stage stator vane 23A, or with an intermediate member 90 held between the first-stage stator vane 23A and the pair of radial-directional wall portions 54, 54' in the axial direction.

In the illustrative embodiments depicted in FIGS. 7 to 9 and 11 for instance, the pair of radial-directional wall portions 54, 54' of the combustors 4 overlap with the recess portion 84 or the protruding portion 86 of the first-stage stator vane 23A in the axial direction. Furthermore, as depicted in the illustrative embodiment depicted in FIG. 10, the pair of radial-directional wall portions 54, 54' of the combustors 4 overlap with the intermediate member 90 held between the first-stage stator vane 23A and the pair of radial-directional wall portions 54, 54' in the axial direction.

In the illustrative embodiments depicted in FIGS. 7 to 11, the pair of radial-directional wall portions 54, 54' of the combustors 4 overlap with the recess portion 84 or the protruding portion 86 of the first-stage stator vane 23A, or with the above described intermediate member 90, also in the circumferential direction.

Figure 9:
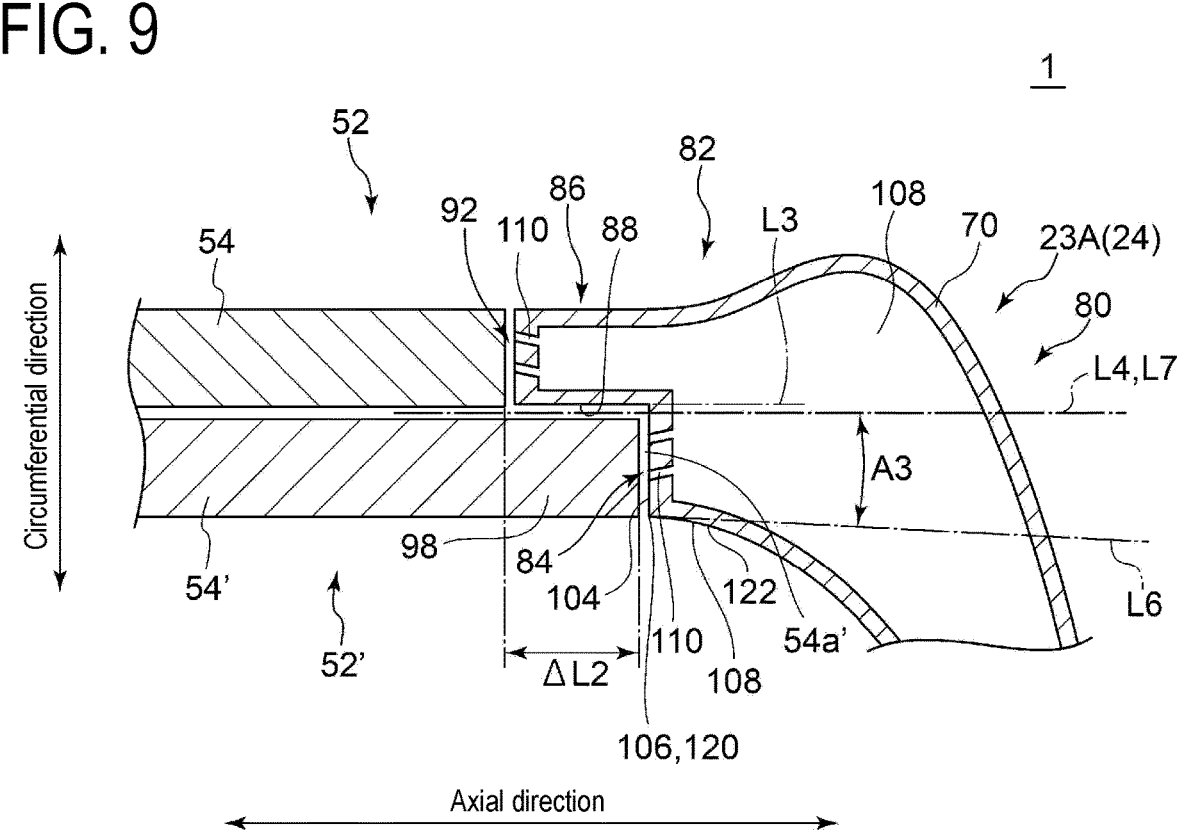
FIG. 9 is a cross-sectional view of a pair of radial-directional wall portions and the first-stage stator vane according to an embodiment, taken along the circumferential direction.
Figure 11:
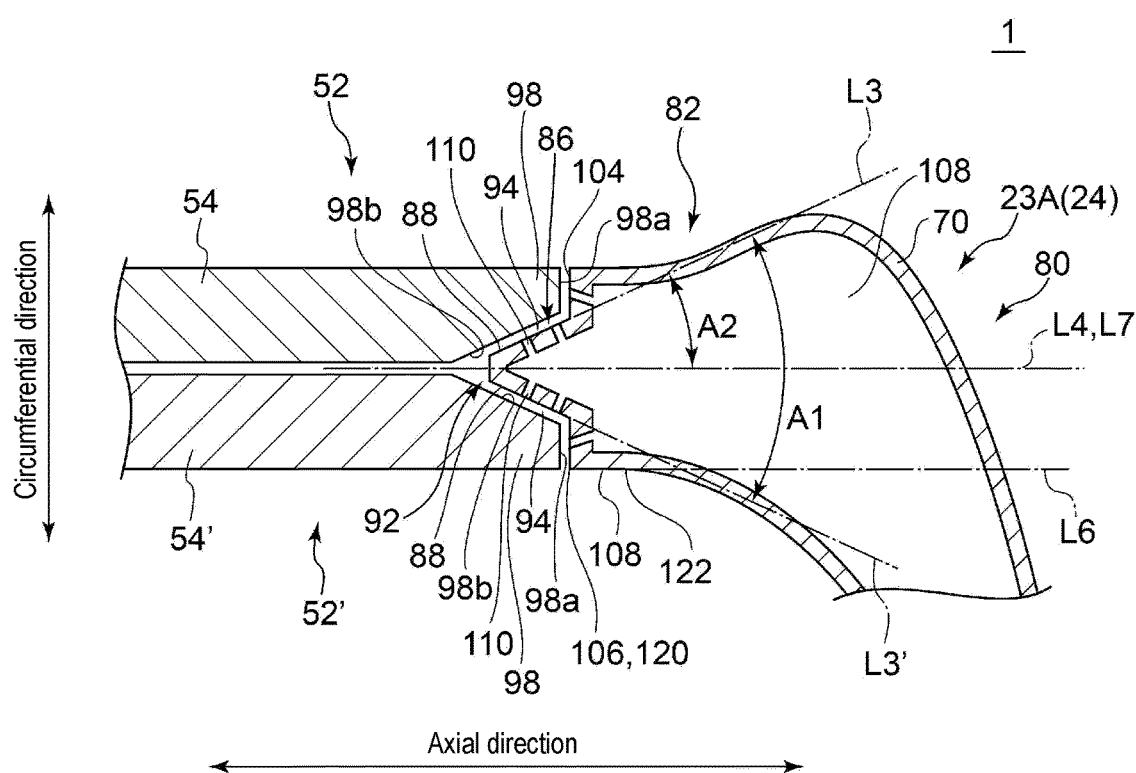
FIG. 11 is a cross-sectional view of a pair of radial-directional wall portions and the first-stage stator vane according to an embodiment, taken along the circumferential direction.

For instance, in the illustrative embodiments depicted in FIGS. 7, 9, and 11, the first-stage stator vane 23A includes the protruding portion 86, and the protruding portion 86 is engaged with a protruding-portion receiving space 92 formed by at least one of the pair of radial-directional wall portions 54, 54'. In this case, the protruding portion 86 has a pair of side wall surfaces 88, and the side wall surfaces 88 face a surface that forms the protruding-portion receiving space 92, of the pair of radial-directional wall portions 54, 54'.

More specifically, in the illustrative embodiments depicted in FIGS. 7 and 11, the protruding-portion receiving space 92 is formed by half grooves 94, 94 respectively disposed on the pair of radial-directional wall portions 54, 54', and the protruding portion 86 of the first-stage stator vane 23A is engaged with the protruding-portion receiving space 92. The pair of side wall surfaces 88 of the protruding portion 86 face a side wall surface 98b that forms the protruding-portion receiving space 92, of each of the pair of radial-directional wall portions 54, 54'.

The half grooves 94 are grooves having a cut-out shape formed along the radial-direction on the downstream-side end portions of the respective radial-directional wall portions 54, 54'.

In the embodiment depicted in FIG. 7, the radial-directional wall portion 54 includes a projecting portion 98 having a top surface 98a positioned on the downstream-side end 54a. Furthermore, the radial-directional wall portion 54 has a step surface 99 formed thereon, positioned upstream of the top surface 98a of the projecting portion 98. The half groove 94 is formed by the step surface 99, and a side wall surface 98b that is closer to the adjacent radial-directional wall portion 54, 54', of the opposite side surfaces of the projecting portion 98. The step surface 99 forming the half groove 94 and the side wall surface 98b of the projecting portion 98 may be orthogonal to each other.

In the embodiment depicted in FIG. 11, the radial-directional wall portion 54 includes a projecting portion 98 having the top surface 98a positioned on the downstream-side end 54a. Of the opposite side surfaces of the projecting portion 98, the side wall surface 98b closer to the adjacent radial-directional wall portion 54, 54' is inclined from the axial direction so as to become closer to the adjacent radial-directional wall portion 54, 54' with distance toward the upstream side. The half groove 94 is formed by the side wall surface 98b.

Further, as depicted in FIGS. 7 and 11, the half grooves 94, 94 are disposed so as to face the pair of adjacent radial-directional wall portions 54, 54', and the protruding-portion receiving space 92 having a groove shape is formed by the half grooves 94, 94.

As depicted in FIGS. 7 and 11, in a state where the protruding portion 86 of the first-stage stator vane 23A is engaged with the protruding-portion receiving space 92 formed by the above described half grooves 94, 94, the top surface 98a of the projecting portion 98 and a flat surface 104 disposed next to the protruding portion 86 in the circumferential direction may face one another.

In the illustrative embodiment depicted in FIG. 9, the protruding-portion receiving space 92 is formed by the length difference of the pair of radial-directional wall portions 54, 54' in the axial direction, and the protruding portion 86 of the first-stage stator vane 23A is engaged with the protruding-portion receiving space 92.

The pair of radial-directional wall portions 54, 54' depicted in FIG. 9 include a radial-directional wall portion (first radial-directional wall portion) 54 that belongs to the outlet portion 52 of the combustor 4, which is the first combustor of combustors 4, 4' disposed adjacent to one another in the circumferential direction, and a radial-directional wall portion (second radial-directional wall portion) 54' that belongs to the outlet portion 52' of the combustor 4', which is the second combustor disposed next to the combustor 4. The radial-directional wall portion (second radial-directional wall portion) 54' extends further downstream than the radial-directional wall portion (first radial-directional wall portion) 54 in the axial direction. The downstream-side end 54a' of the radial-directional wall portion (second radial-directional wall portion) 54' protrudes further downstream than the downstream-side end 54a of the radial-directional wall portion (first radial-directional wall portion) 54 by length $\Delta L2$, where the length difference of the pair of radial-directional wall portions 54, 54' in the axial direction forms the protruding-portion receiving space 92. The pair of side wall surfaces 88 of the protruding portion 86 face the side wall surfaces of the radial-directional wall portions (second radial-directional wall portions) 54' that form the protruding-portion receiving space 92.

In the illustrative embodiments depicted in FIGS. 7, 9, and 11, the protruding-portion receiving space 92 to be engaged with the protruding portion 86 of the first-stage stator vane 23A may be a groove 58 (see FIGS. 3 and 5) formed so as to extend along the radial direction on at least one of the downstream-side ends 54a, 54a' of the pair of radial-directional wall portions 54, 54'.

In this case, in each combustor 4, the position of at least one of the downstream-side ends 54a, 54a' of the radial-directional wall portions 54, 54' in the axial direction and the position of the downstream-side end 56a (see FIG. 5) of the circumferential-directional wall portion 56 may coincide at the position of the downstream-side end 4a (see FIG. 3) of the combustor 4.

Figure 8:
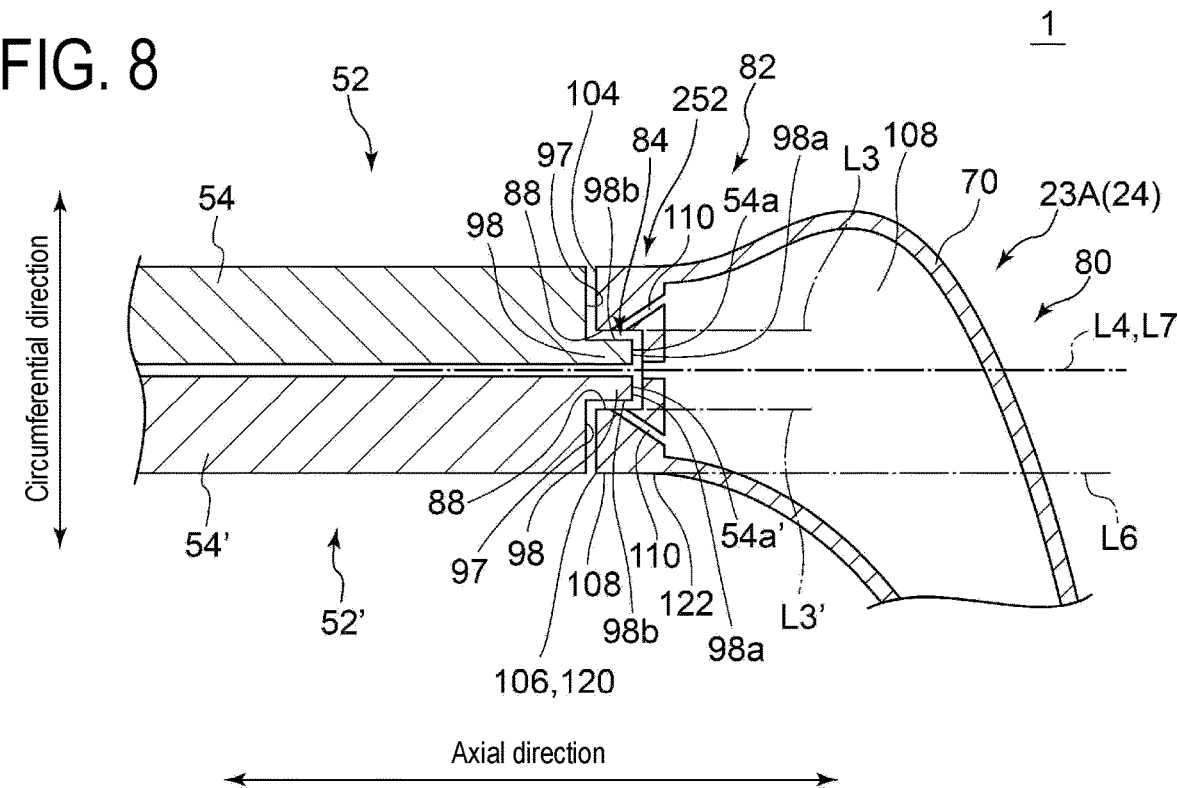
FIG. 8 is a cross-sectional view of a pair of radial-directional wall portions and the first-stage stator vane according to an embodiment, taken along the circumferential direction.
Figure 10:
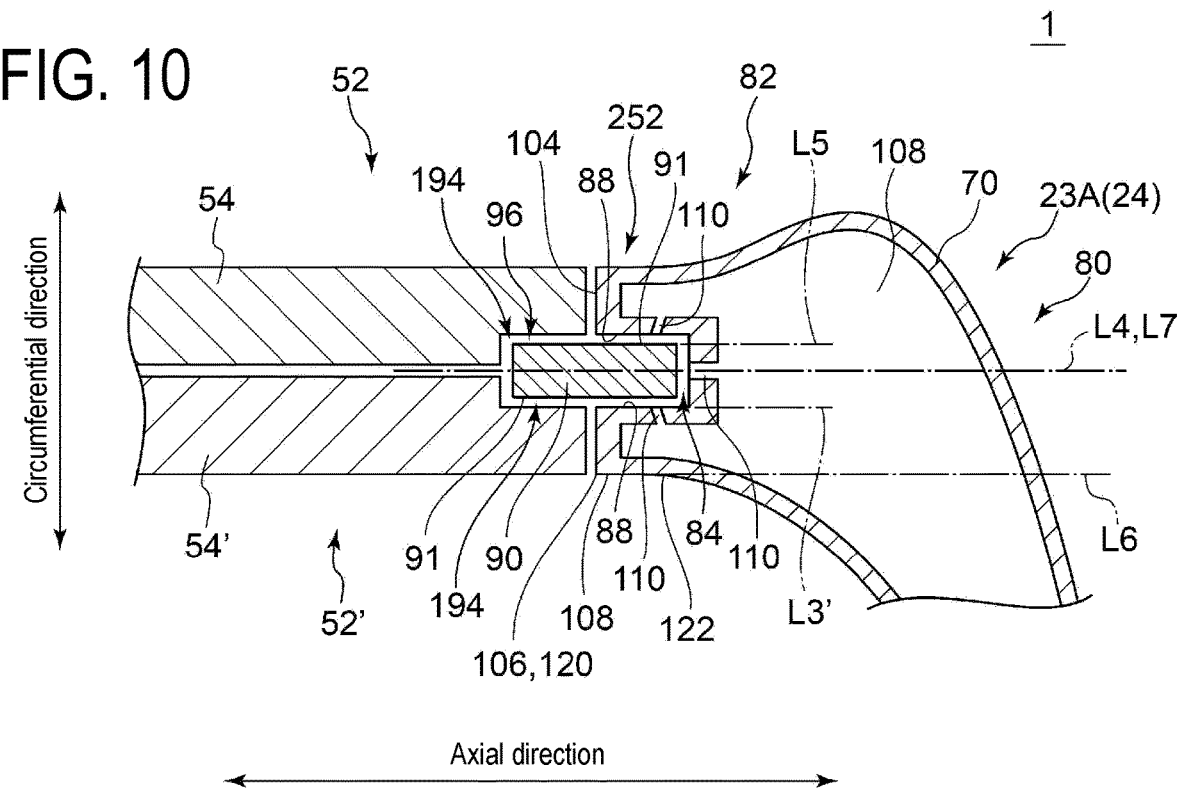
FIG. 10 is a cross-sectional view of a pair of radial-directional wall portions and the first-stage stator vane according to an embodiment, taken along the circumferential direction.

Furthermore, for instance, in the illustrative embodiments depicted in FIGS. 8 to 10, the first-stage stator vane 23A includes the recess portion 84, and the recess portion 84 is engaged with the projecting portion 98 formed by at least one of the pair of radial-directional wall portions 54, 54', or the intermediate member 90 held between the first-stage stator vane 23A and the pair of radial-directional wall portions 54, 54'. In this case, the recess portion 84 has a pair of side wall surfaces 88, and the side wall surfaces 88 face the side wall surfaces of the projecting portion 98 or the intermediate member 90, of the pair of radial-directional wall portions 54, 54'.

More specifically, in the illustrative embodiment depicted in FIG. 8, the downstream-side ends 54a, 54a' of the pair of radial-directional wall portions 54, 54' include projecting portions 98, 98 projecting toward the downstream side in the axial direction, and the projecting portions 98, 98 are engaged with the recess portion 84 of the first-stage stator vane 23A. The projecting portion 98 includes the top surface 98a positioned at the downstream-side end 54a of the radial-directional wall portion 54, 54', and the side wall surface 98b. The step surface 97 is formed on the radial-directional wall portion 54, 54', next to the projecting portion 98 in the circumferential direction. The pair of side wall surfaces 88 of the recess portion 84 of the first-stage stator vane 23A face the side wall surfaces 98b of the projecting portions 98. Furthermore, the top surface 98a of the projecting portion 98 and the side wall surface 98b may be orthogonal to one another.

As depicted in FIG. 8, in a state where the recess portion 84 of the first-stage stator vane 23A is engaged with the projecting portion 98, the step surface 97 of the radial-directional wall portion 54, 54' and the flat surface 104 disposed next to the recess portion 84 of the first-stage stator vane 23A in the circumferential direction may face one another.

In the illustrative embodiment depicted in FIG. 9, of the pair of radial-directional wall portions 54, 54', the projecting portion 98 is formed by the downstream-side end 54a' of the radial-directional wall portion (second radial-directional wall portion) 54' that extends further downstream than the radial-directional wall portion (first radial-directional wall portion) 54 in the axial direction. Furthermore, the recess portion 84 of the first-stage stator vane 23A is engaged with the downstream-side end 54a' of the radial-directional wall portion (second radial-directional wall portion) 54' that serves as the projecting portion 98. In this case, the recess portion 84 has a side wall surface 88, and the side wall surface 88 faces a side wall portion of the radial-directional wall portion (second radial-directional wall portion) 54' that forms the projecting portion 98.

In the illustrative embodiment depicted in FIG. 10, the intermediate member 90 is held between the first-stage stator vane 23A and the pair of radial-directional wall portions 54, 54'. The intermediate member 90 is engaged with an intermediate member receiving space 96 formed by at least one of the pair of radial-directional wall portions 54, 54' (in the embodiment depicted in FIG. 10, the intermediate member receiving space 96 is formed by the pair of radial-directional wall portions 54, 54'). That is, the intermediate member 90 is engaged with the recess portion 84 of the first-stage stator vane 23A, between the first-stage stator vane 23A and the pair of radial-directional wall portions 54, 54'. In this case, the recess portion 84 has a pair of side wall surfaces 88, and the side wall surfaces 88 face side wall surfaces of the intermediate member 90.

In the illustrative embodiments depicted in FIG. 10, the intermediate member receiving space 96 is formed by half grooves 194, 194 respectively disposed on the pair of radial-directional wall portions 54, 54'.

The half grooves 194 are grooves having a cut-out shape formed along the radial-directional wall portion at downstream-side end portions of the respective radial-directional wall portions 54, 54'. The half grooves 194, 194 disposed respectively on the pair of adjacent radial-directional wall portions 54, 54' are disposed so as to face one another, and the intermediate member receiving space 96 having a groove shape is formed by the half grooves 194, 194.

In a state where the intermediate member 90 is engaged with the intermediate member receiving space 96 formed by the above described half grooves 194, 194, the end surface positioned at the downstream-side end 54a of the radial-directional wall portion 54, 54' and a flat surface 104 disposed next to the recess portion 84 of the first-stage stator vane 23A in the circumferential direction may face one another.

In a gas turbine including a plurality of combustors arranged in the circumferential direction, the outlet portions of adjacent combustors 4 are in communication with one another via a space (gap) formed between the downstream ends of the combustors and the first-stage stator vane. Thus, acoustic propagation occurs between adjacent combustors via the above described space, and the acoustic propagation may cause combustion vibration.

In this regard, in the above described embodiments, the pair of radial-directional wall portions 54, 54' overlap with the recess portion 84 or the protruding portion 86 of the first-stage stator vane 23A, or with the intermediate member 90 held between the first-stage stator vane 23A and the pair of radial-directional wall portions 54, 54' in the axial direction.

Thus, even if the first-stage stator vane 23A is relatively displaced mainly in the axial direction with respect to the combustors 4 due to displacement of the relative positional relationship in the axial direction during operation of the gas turbine 1 from the positional relationship intended at the time of design, for instance, it is possible to suppress an increase of the gap, in the circumferential direction, between the pair of side wall surfaces 88 of the recess portion 84 or the protruding portions 86 of the first-stage stator vane 23A and the radial-directional wall portions 54, 54' or the intermediate member 90 that brings the outlet portions 52 of adjacent combustors 4 into communication, and hinder acoustic propagation between the outlet portions 52 of the plurality of combustors 4. Such displacement may occur due to, for instance, assembly errors of the gas turbine, deformation of the gas turbine due to aging, or thermal deformation where the first-stage stator vane moves away from the combustors during operation of the gas turbine 5.

Thus, it is possible to reduce combustion vibration due to acoustic propagation between the outlet portions 52 of the plurality of combustors 4 while reducing thermal stress that occurs in the combustors 4 during operation of the gas turbine 1. Accordingly, the frequency of the combustion vibration that needs to be addressed decreases, and it is possible to operate the gas turbine stably. Furthermore, since the frequency of the combustion vibration that needs to be addressed decreases, it is possible to reduce the installation number of acoustic liners for addressing the frequency of combustion vibration that has been typically occurred, which makes it possible to reduce the installation costs.

In some embodiments, the angle A1 formed between the pair of side wall surfaces 88 of the recess portion 84 or the protruding portion 86 of the first-stage stator vane 23A is less than 90 angular degrees.

In some embodiments, the side wall surface 88 of the recess portion 84 or the protruding portion 86 of the first-stage stator vane 23A or the wall surface 91 of the intermediate member 90 is parallel to the axial direction, or forms angle A2 of less than 45 angular degrees with the axial direction.

For instance, in the illustrative embodiment depicted in FIG. 7, in a cross section along the circumferential direction, the line L3 and the line L3' each of which is along the extension direction of the pair of side wall surfaces 88 of the protruding portion 86 of the first-stage stator vane 23A are substantially parallel, and thus the angle A1 formed between the line L3 and the line L3' is approximately zero angular degrees, which is less than 90 angular degrees.

Furthermore, in the illustrative embodiment depicted in FIG. 7, in a cross section along the circumferential direction, the line L3 and the line L3' each of which is along the extension direction of the pair of side wall surfaces 88 of the protruding portion 86 of the first-stage stator vane 23A, and the line L4 extending in the axial direction are substantially parallel, and thus the angle A2 formed between the line L3 or the line L3' and the line L4 is approximately zero angular degrees, which is less than 45 angular degrees.

Furthermore, for instance, in the illustrative embodiment depicted in FIG. 8, in a cross section along the circumferential direction, the line L3 and the line L3' each of which is along the extension direction of the pair of side wall surfaces 88 of the recess portion 84 of the first-stage stator vane 23A are substantially parallel, and thus the angle A1 formed between the line L3 and the line L3' are approximately zero angular degrees, which is less than 90 angular degrees.

Furthermore, in the illustrative embodiment depicted in FIG. 8, in a cross section along the circumferential direction, the line L3 and the line L3' each of which is along the extension direction of the pair of side wall surfaces 88 of the recess portion 84 of the first-stage stator vane 23A, and the line L4 extending in the axial direction are substantially parallel, and thus the angle A2 formed between the line L3 or the line L3' and the line L4 is approximately zero angular degrees, which is less than 45 angular degrees.

Furthermore, for instance, in the illustrative embodiment depicted in FIG. 9, in a cross section along the circumferential direction, the line L3 along the extension direction of the side wall surface 88 of the protruding portion 86 of the first-stage stator vane 23A, and the line L4 extending in the axial direction are substantially parallel, and thus the angle A2 formed between the line L3 and the line L4 is approximately zero angular degrees, which is less than 45 angular degrees.

Furthermore, for instance, in the illustrative embodiment depicted in FIG. 10, in a cross section along the circumferential direction, the line L3 and the line L3' each of which is along the extension direction of the pair of side wall surfaces 88 of the recess portion 84 of the first-stage stator vane 23A are substantially parallel, and thus the angle A1 formed between the line L3 and the line L3' are approximately zero angular degrees, which is less than 90 angular degrees. In FIG. 10, the line L3 is not depicted to simplify the illustration.

Furthermore, in the illustrative embodiment depicted in FIG. 10, in a cross section along the circumferential direction, the line L5 and the line L5' each of which is along the extension direction of the wall surfaces 91 of the intermediate member 90, and the line L4 extending in the axial direction are substantially parallel, and thus the angle A2 formed between the line L5 or the line L5' and the line L4 is approximately zero angular degrees, which is less than 45 angular degrees. In FIG. 10, the line L5' is not depicted to simplify the illustration.

Furthermore, for instance, in the illustrative embodiment depicted in FIG. 11, in a cross section along the circumferential direction, the angle A1 formed between the line L3 and the line L3' each of which is along the extension direction of the pair of side wall surfaces 88 of the protruding portion 86 of the first-stage stator vane 23A is less than 90 angular degrees.

Furthermore, in the illustrative embodiment depicted in FIG. 11, in a cross section along the circumferential direction, the angle A2 formed between the line L3 and the line L3' each of which is along the extension direction of the pair of side wall surfaces 88 of the protruding portion 86 of the first-stage stator vane 23A, and the line L4 extending in the axial direction is less than 45 angular degrees.

As described above, when the angle A1 formed between the pair of side wall surfaces 88 of the recess portion 84 or the protruding portion 86 of the first-stage stator vane 23A is less than 90 degrees, or the side wall surfaces 88 of the recess portion 84 or the protruding portion 86 of the first-stage stator vane 23A or the wall surface 91 of the intermediate member 90 is parallel to the axial direction or forms the angle A2 of less than 45 angular degrees with the axial direction, even if the first-stage stator vane 23A is relatively displaced mainly in the axial direction with respect to the combustors 4 due to thermal deformation or displacement of the relative positional relationship in the axial direction between the transition piece and the first-stage stator vane during operation of the gas turbine 1 from the positional relationship intended at the time of design, for instance, it is possible to suppress an increase in the gap, in the circumferential direction, between the pair of side wall surfaces 88 of the recess portion 84 or the protruding portions 86 of the first-stage stator vane 23A and the counterpart member that brings the outlet portions of adjacent combustors 4 into communication.

Figure 20:
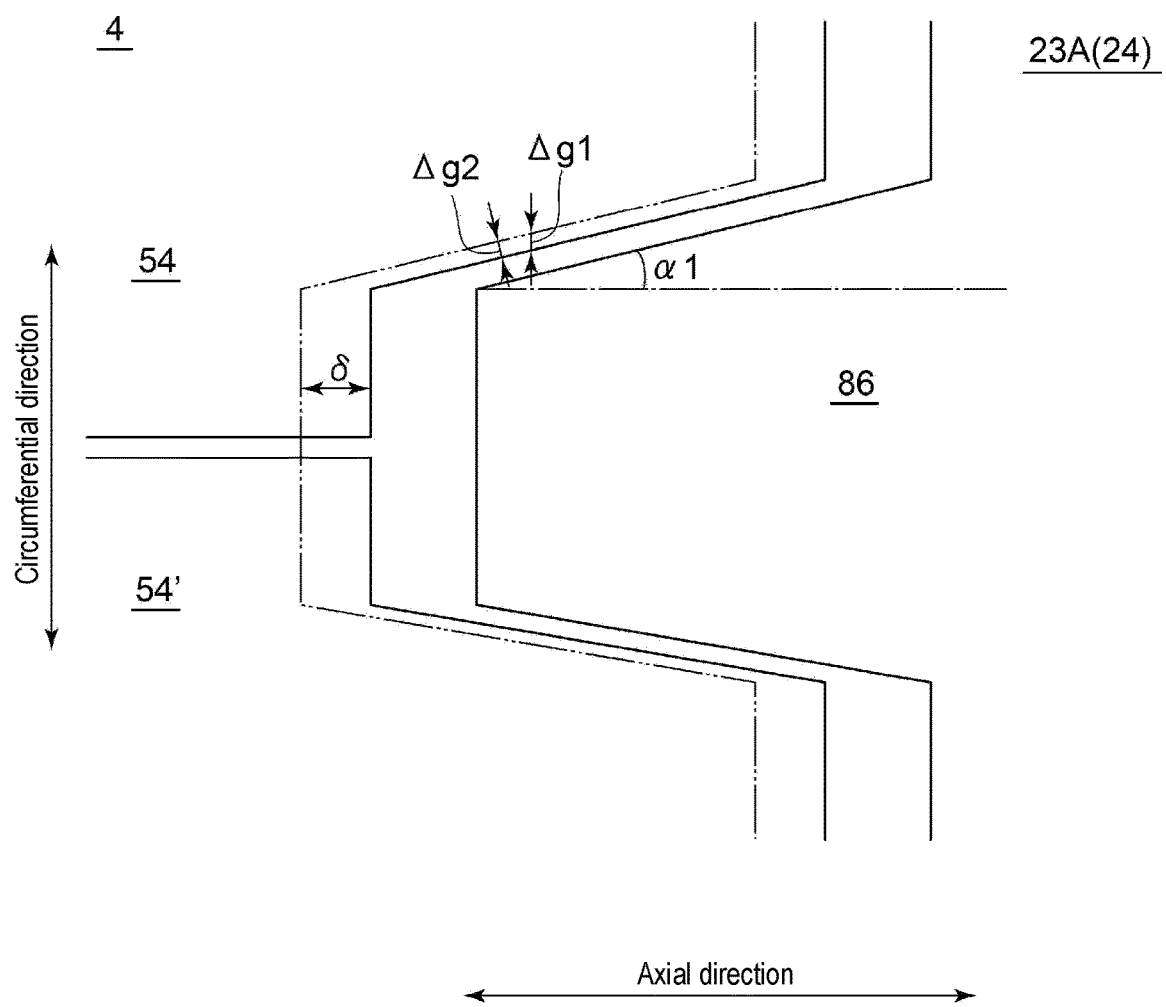
FIG. 20 is a diagram for describing the size change of the gap between the first-stage stator vane and a pair of radial-directional wall portions at the time of thermal deformation of the combustor.

Herein, FIG. 20 is a diagram for describing the size change of the gap between the first-stage stator vane 23A and a pair of radial-directional wall portions 54, 54' at the time of thermal deformation of the combustors 4.

In some embodiments, when the first-stage stator vane 23A is displaced in the axial direction by the first distance δ in a direction away from the combustors 4 due to thermal deformation of the gas turbine 1, the increase amount Δg2 of the size of the gap along the normal direction of the side wall surface 88 is smaller than the first distance δ.

For instance, in the example depicted in FIG. 20, the angular degree of the angle formed between the side wall surfaces 88 and the protruding portion 86 and the axial direction is α1. At this time, if the first-stage stator vane 23A is displaced in the axial direction by the first distance δ in a direction away from the combustors 4 due to thermal deformation of the gas turbine 1, the increase amount Δg2 of the size of the gap along the normal direction of the side wall surfaces 88 is δ×sin α1. Further, under the same conditions, the increase amount Δg1 of the size of the gap along the circumferential direction is δ×tan α1.

Thus, in a range where the angle α1 is not smaller than zero angular degrees and not greater than 90 angular degrees, the smaller the angular degree al is, the smaller the increase amount Δg1 and the increase amount Δg2 are, where Δg1 is the increase amount of the size of the gap along the circumferential direction and Δg2 is the increase amount of the size of the gap along the normal direction of the side wall surface 88, with respect to the relative displacement amount δ, in the axial direction, of the first-stage stator vane 23A relative to the combustors 4. In particular, when the above angle α1 is less than 45 angular degrees, the increase amount Δg2 of the size of the gap along the normal direction of the side wall surface 88 is less than δ.

As described above, in the above embodiment, even when the first-stage stator vane 23A is displaced in the axial direction away from the combustors 4 due to thermal deformation of the gas turbine 1, it is possible to suppress an increase of the gap, in the normal direction, between the pair of side wall surfaces 88 of the recess portion 84 or the protruding portions 86 of the first-stage stator vane 23A and the counterpart member that brings the outlet portions 52 of adjacent combustors 4 into communication. Accordingly, it is possible to hinder acoustic propagation between the outlet portions 52 of the plurality of combustors 4. Thus, it is possible to reduce combustion vibration due to acoustic propagation between the outlet portions 52 of the plurality of combustors 4 while reducing thermal stress that occurs in the combustors 4 during operation of the gas turbine 1.

In some embodiments, as depicted in FIGS. 7 to 11 for instance, the second portion 82 of the first-stage stator vane 23A includes at least one flat surface 104 disposed next to the recess portion 84 or the protruding portion 86, and at least one connection surface 108 connected to the flat surface 104. The connection surface 108 is disposed between the flat surface 104 and the surface of the airfoil 70 of the first portion 80. The leading-edge side end 120 of the connection surface 108 is connected to the flat surface 104, and the trailing edge side end 122 of the connection surface 108 is continuously connected to the surface of the airfoil 70.

In some embodiments, as depicted in FIGS. 3 and 5, the second portion 82 of the first-stage stator vane 23A extends to the position of the upstream-side end surface 61 of the inner shroud 60 or the upstream-side end surface 63 of the outer shroud 62 in the axial direction. Furthermore, the first-stage stator vane 23A includes a flat portion 105 disposed next to the recess portion 84 or the protruding portion 86 in the circumferential direction (in the example depicted in FIGS. 3 and 5, next to the protruding portion 86). The flat portion 105 forms the above described flat surface 104 (see FIGS. 7 to 11), and the flat surface 104 is disposed so as to continue to the upstream-side end surface 61 of the inner shroud 60 or the upstream-side end surface 63 of the outer shroud 62.

As described above, with the flat surface 104 disposed next to the recess portion 84 or the protruding portion 86 of the second portion 82 of the first-stage stator vane 23A, an acoustic propagation path formed between the recess portion 84 or the protruding portion 86 of the first-stage stator vane 23A and the counterpart member has a bend shape formed by the flat surface 104 and the side wall surfaces 88 of the recess portion 84 or the protruding portion 86 of the first-stage stator vane 23A. Accordingly, it is possible to suppress acoustic propagation between the outlet portions 52 of the plurality of combustors 4 effectively.

Furthermore, the connection surface 108 disposed between the above described flat surface 104 and the surface of the airfoil 70 has the trailing edge side end 122 continuously connected to the surface of the airfoil 70, and thus the flow of combustion gas is less likely to cause turbulence compared to a case where the flat surface 104 and the surface of the airfoil 70 are not connected continuously to one another. In this way, it is possible to reduce fluid loss in the gas turbine 1.

In some embodiments, as depicted in FIGS. 7 to 11 for instance, the connection surface 108 is configured such that the direction of the tangent L6 to the connection point 106 to the flat surface 104 forms an angle A3 (see FIG. 9) of not greater than 20 degrees with the bisector L7 of the angle A1 formed between the pair of side wall surfaces 88.

Herein, "bisector" refers to the line that bisects the angle between the pair of side wall surfaces when the angle is greater than zero angular degrees, and refers to a line parallel to each of the side wall surfaces when the angle between the pair of side wall surfaces is zero angular degrees (when the side wall surfaces are parallel).

Furthermore, in the embodiments depicted in FIGS. 7, 8, 10, and 11, the tangent L6 at the connection point 106 to the flat surface 104 is substantially parallel to the bisector L7 of the angle A1 formed between the pair of side wall surfaces 88, and thus the angle A3 between the direction of the tangent L6 and the bisector L7 is approximately zero angular degrees, which is not greater than 20 angular degrees.

As described above, when the angle formed between the direction of the tangent L6 to the connection surface 108 at the connection point 106 between the connection surface 108 and the flat surface 104 and the bisector L7 of the angle A1 formed between the pair of side wall surfaces 88 is not greater than 20 angular degrees (that is, the direction of the tangent L6 of the connection surface 108 is substantially along the bisector L7), it is possible to suppress turbulence of the flow of combustion gas by guiding the flow of combustion gas along the axial direction after passing the outlet portions 52 of the combustors 4 to the surface of the airfoil 70. In this way, it is possible to reduce fluid loss in the gas turbine 1.

In some embodiments, the recess portion 84 or the protruding portion 86 of the first-stage stator vane 23A is disposed along the vane height direction of the first-stage stator vane 23A (typically, direction along the radial direction of the gas turbine 1).

In an embodiment, as depicted in FIG. 4, the recess portion 84 or the protruding portion 86 of the first-stage stator vane 23A is disposed along the vane height direction from the root portion 112 to the tip portion 114 of the first-stage stator vane 23A.

Furthermore, in an embodiment, the recess portion 84 or the protruding portion 86 of the first-stage stator vane 23A is disposed along the vane height direction over a length that is not smaller than the length between the root portion 112 and the tip portion 114 of the first-stage stator vane 23A in the vane height direction.

Furthermore, in the present specification, the root portion 112 of the first-stage stator vane 23A is a radially outer end portion of the airfoil 70 of the first-stage stator vane 23A. In the stator vane unit 102 depicted in FIG. 3, the root portion 112 may be a connection portion where the airfoil 70 is connected to the outer shroud 62.

Furthermore, in the present specification, the tip portion 114 of the first-stage stator vane 23A is a radially inner end portion of the airfoil 70 of the first-stage stator vane 23A. In the stator vane unit 102 depicted in FIG. 3, the tip portion 114 may be a connection portion where the airfoil 70 is connected to the inner shroud 60.

As described above, with the recess portion 84 or the protruding portion 86 of the first-stage stator vane 23A being disposed along the vane height direction from the root portion 112 to the tip portion 114 of the first-stage stator vane 23A, or over a length that is not smaller than half the length between the root portion 112 and the tip portion 114 of the first-stage stator vane 23A in the vane height direction, it is possible to suppress acoustic propagation between the outlet portions 52 of the plurality of combustors 4 by causing the recess portion 84 or the protruding portion 86 to be engaged with the counterpart member at the side of the combustors 4.

In some embodiments, as depicted in FIGS. 7 to 11 for instance, inside the first-stage stator vane 23A, a cooling passage 109 for flowing a cooling medium for cooling the first-stage stator vane 23A is formed.

Further, at least one cooling hole 110 is formed on the second portion 82 of the first-stage stator vane 23A. The cooling hole 110 has an end that has an opening into the cooling passage 109, and the other end that has an opening on the outer surface of the recess portion 84 or the protruding portion 86 of the first-stage stator vane 23.

Alternatively, the cooling hole 110 has an end that has an opening into the cooling passage 109, and the other end that has an opening into the gap between at least one of the radial-directional wall portions 54, 54' or the intermediate member 90 and the first-stage stator vane 23A.

The cooling passage 109 may be supplied with compressed air generated by the compressor 2 as a cooling medium, for instance.

In this case, it is possible to supply a cooling fluid from the cooling passage 109 to the gap between the recess portion 84 or the protruding portion 86 of the first-stage stator vane 23A and the counterpart member that the recess portion 84 or the protruding portion 86 is to be engaged with, via the cooling hole 110. Alternatively, it is possible to supply a cooling fluid from the cooling passage 109 into the gap between at least one of the radial-directional wall portions 54, 54' or the intermediate member 90 and the first-stage stator vane 23A via the cooling hole 110. That is, it is possible to blow the cooling fluid from the cooling passage 109 to the above described gap via the cooling hole 110.

With the flow of the cooling fluid supplied to the gap or the like between the recess portion 84 or the protruding portion 86 of the first-stage stator vane 23A and the counterpart member, it is possible to hinder acoustic propagation between the outlet portions 52 of the combustors 4 via the gap and suppress the acoustic propagation, while cooling the first-stage stator vane 23A. Accordingly, it is possible to effectively reduce combustion vibration due to acoustic propagation between the outlet portions 52 of the plurality of combustors 4.

FIGS. 12A to 19 are each a configuration diagram of the gas turbine 1 that includes a seal member according to an embodiment, each showing a cross section of the pair of radial-directional wall portions 54, 54' of the combustors 4 and the first-stage stator vane 23A taken along the circumferential direction.

In the illustrative embodiments depicted in FIGS. 12A to 19, the gas turbine 1 includes a seal member 200 held between the first-stage stator vane 23A and the pair of radial-directional wall portions 54, 54'.

With the seal member 200 being held between the first-stage stator vane 23A and the pair of radial-directional wall portions 54, 54' as described above, it is possible to suppress acoustic propagation between the outlet portions 52 of the plurality of combustors 4 even more effectively.

The seal member 200 may be the above described intermediate member 90 (the intermediate member 90 held between the recess portion 84 or the protruding portion 86 of first-stage stator vane 23A or the first-stage stator vane 23A and the pair of radial-directional wall portions 54, 54' in the axial direction).

Next, with reference to FIGS. 12A to 19, the gas turbine 1 that includes the seal member 200 according to some embodiments will be described.

Figure 12A:
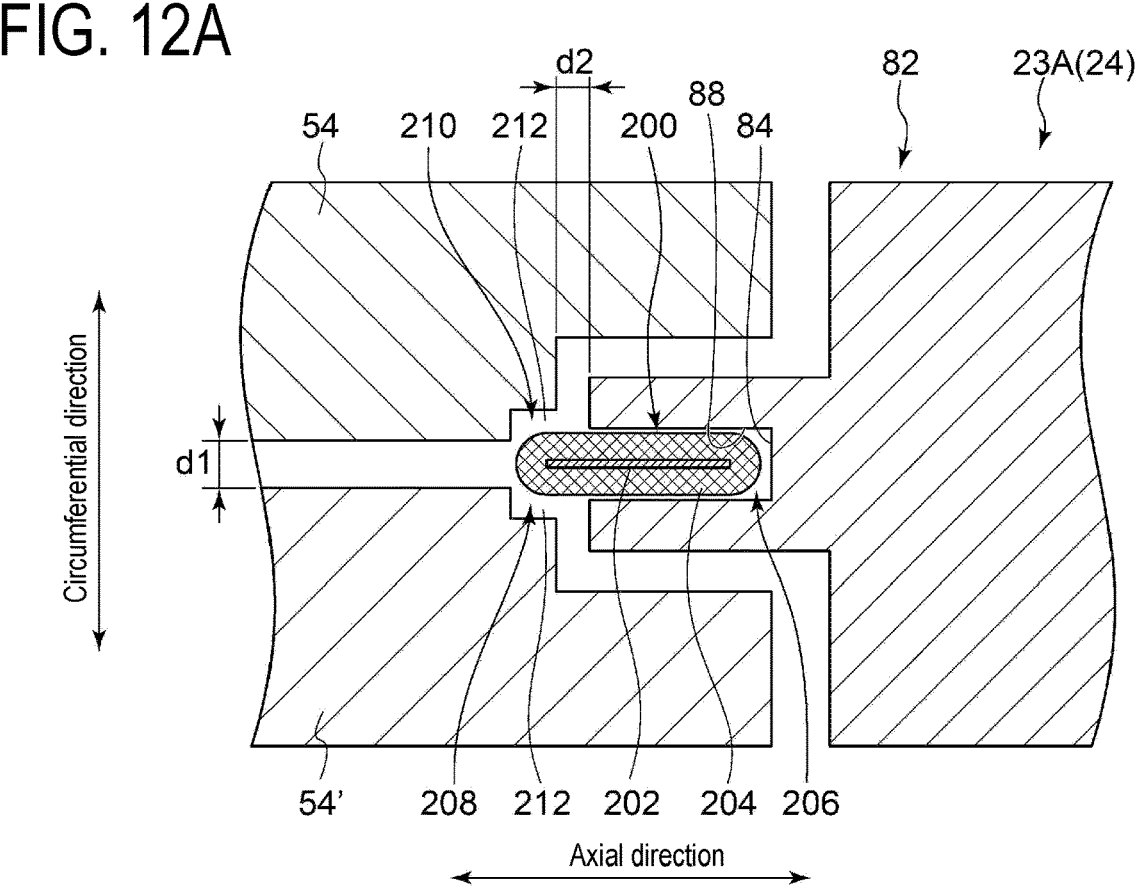
FIG. 12A is a configuration diagram of a gas turbine with a seal member according to an embodiment.
Figure 12B:
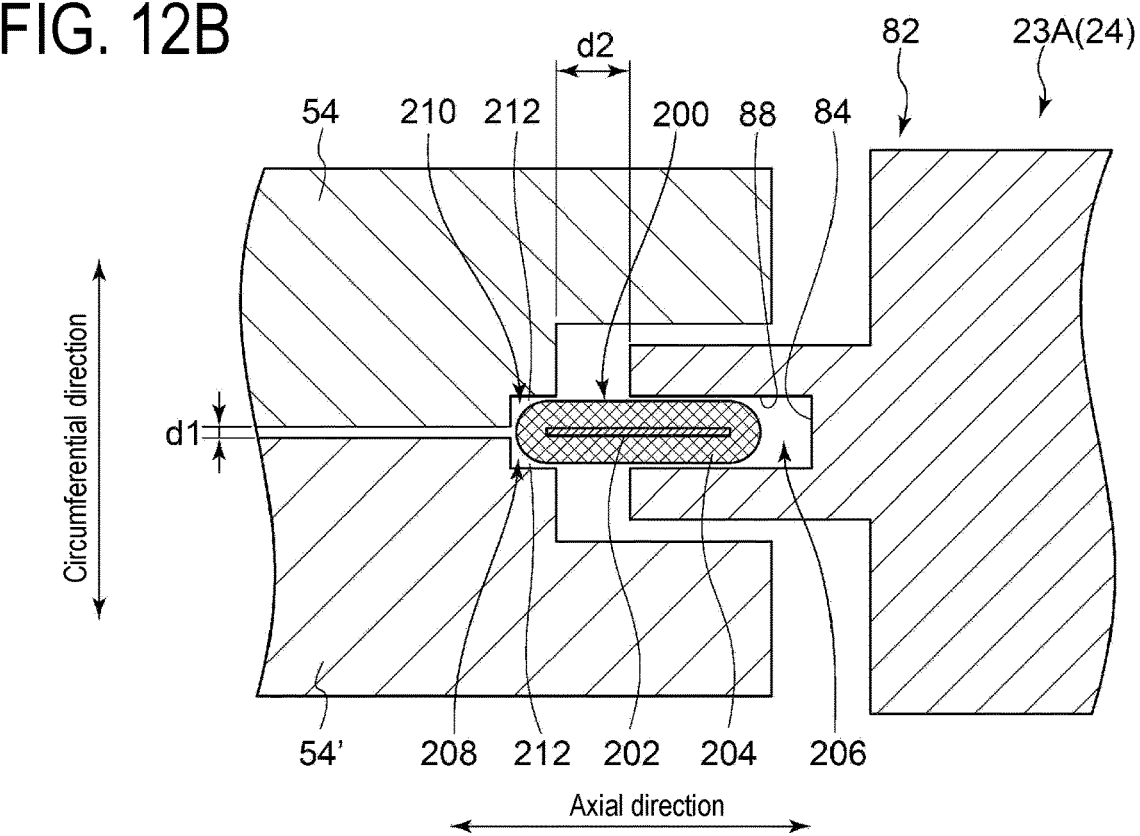
FIG. 12B is a configuration diagram of a gas turbine with a seal member according to an embodiment.
Figure 13A:
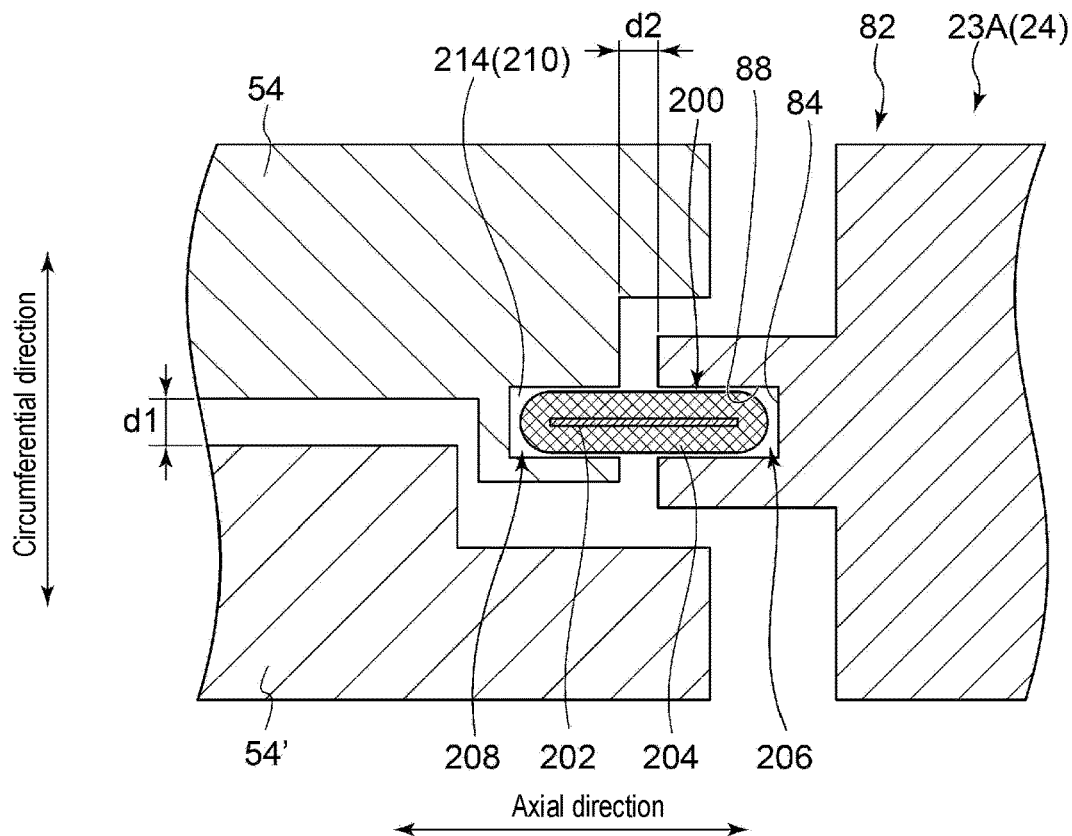
FIG. 13A is a configuration diagram of a gas turbine with a seal member according to an embodiment.
Figure 13B:
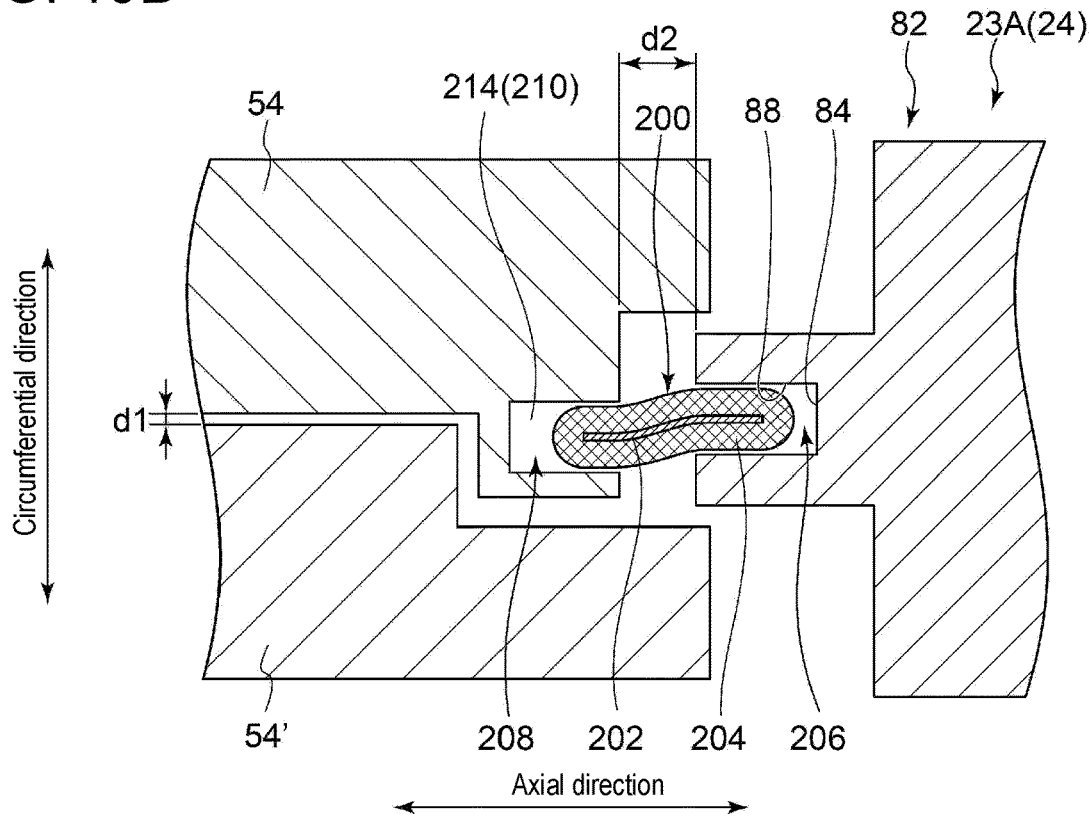
FIG. 13B is a configuration diagram of a gas turbine with a seal member according to an embodiment.
Figure 14A:
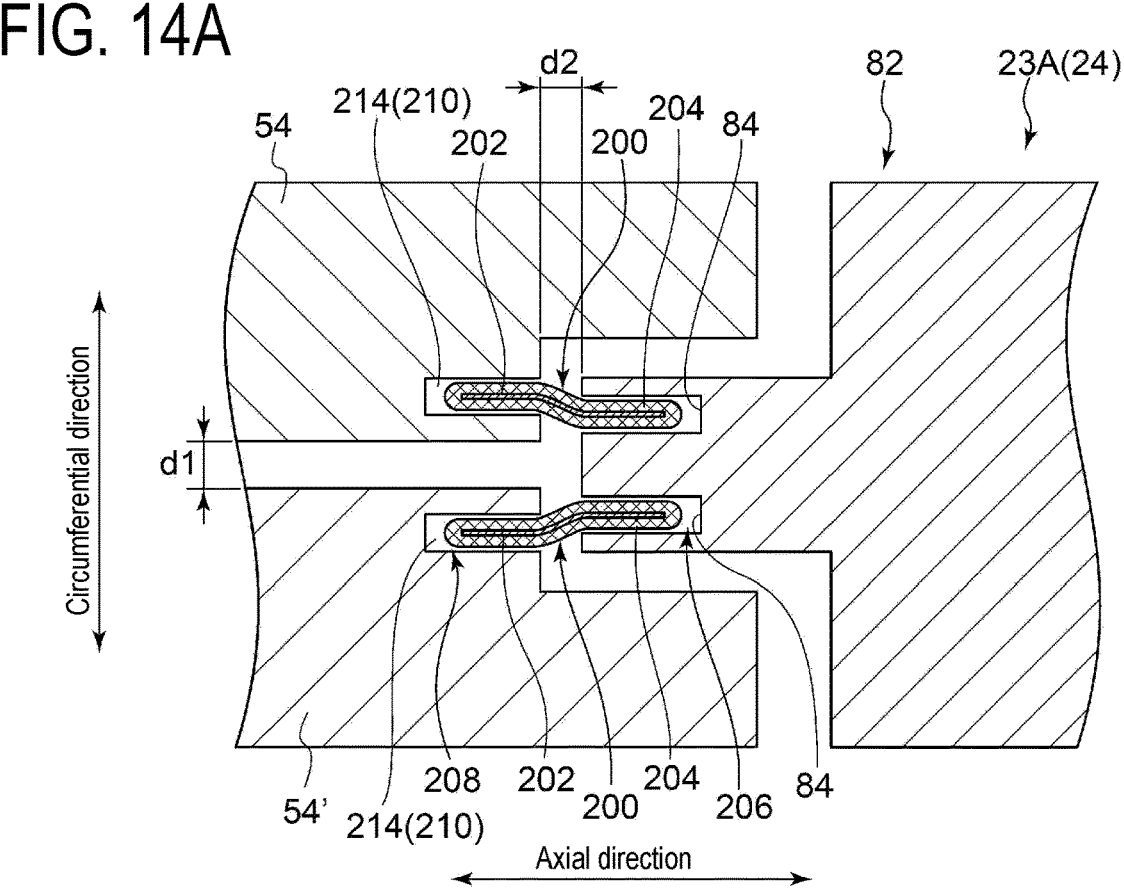
FIG. 14A is a configuration diagram of a gas turbine with a seal member according to an embodiment.
Figure 14B:
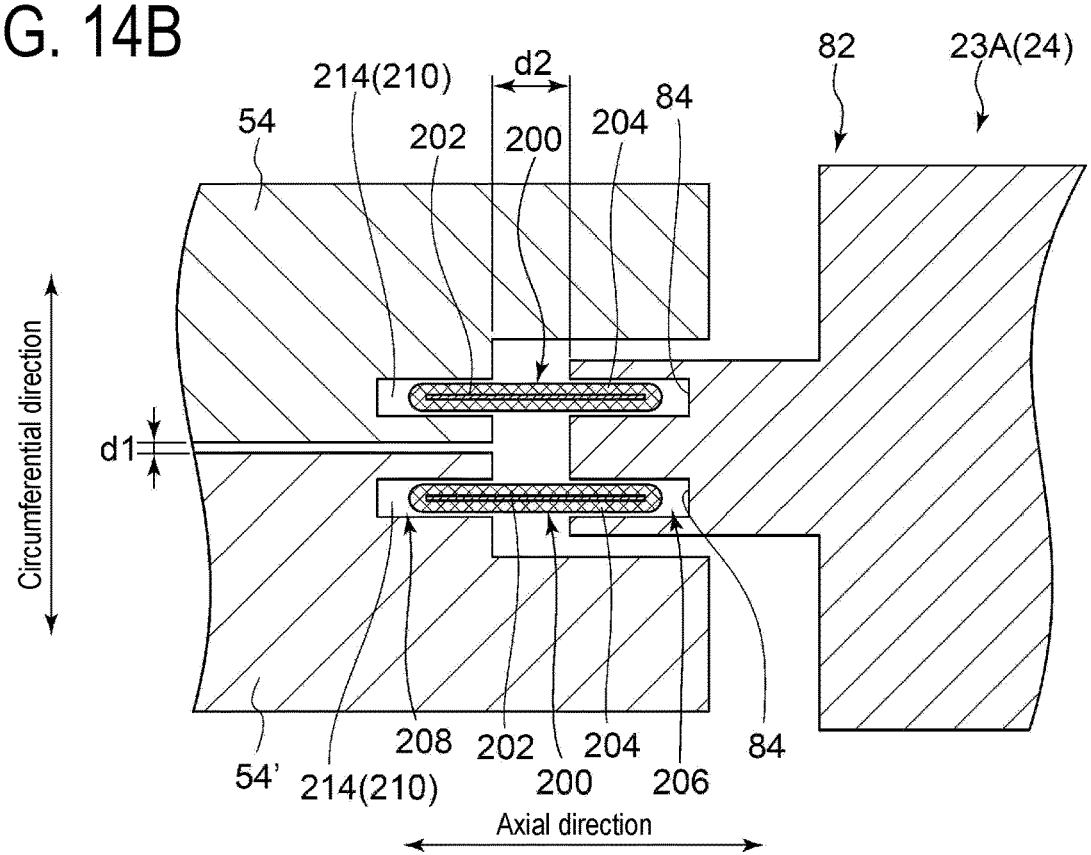
FIG. 14B is a configuration diagram of a gas turbine with a seal member according to an embodiment.

FIGS. 12A, 13A, and 14A are each a diagram showing the gas turbine 1 that includes the seal member 200 according to an embodiment, where the displacement of the relative positional relationship in the axial direction between the transition piece and the first-stage stator vane from the positional relationship intended at the time of design or thermal deformation that occurs in the combustors 4 is relatively small (e.g. when the gas turbine is stopped). FIGS. 12B, 13B, and 14B are each a diagram showing the gas turbine 1 depicted in FIGS. 12A, 13A, and 14A, where the displacement of the relative positional relationship in the axial direction between the transition piece and the first-stage stator vane from the positional relationship intended at the time of design or thermal deformation that occurs in the combustors 4 is relatively large (e.g. when the gas turbine 1 is started or in operation).

As can be seen from FIGS. 12A to 13B, in some embodiments, the first-stage stator vane 23A is displaced mainly in the axial direction relative to the combustors 4 due to thermal deformation of the combustors 4 or the like or displacement of the relative positional relationship in the axial direction between the transition piece and the first-stage stator vane from the positional relationship intended at the time of design, for instance. Thus, when displacement of the relative positional relationship in the axial direction from the positional relationship intended at the time of design or thermal deformation that occurs in the combustors 4 or the like is relatively large (see FIGS. 12B, 13B and 14B), the distance d2 between the combustors 4 and the first-stage stator vane 23A becomes greater than when displacement or thermal deformation is relatively small (see FIGS. 12A, 13A, and 14A).

Furthermore, as can be seen from FIGS. 12A to 13B, in some embodiments, the pair of radial-directional wall portions 54, 54' of adjacent combustors 4 are relatively displaced from one another in the circumferential direction due to thermal deformation of the combustors 4 or the like or displacement of the relative positional relationship in the axial direction between the transition piece and the first-stage stator vane from the positional relationship intended at the time of design, for instance. Thus, when displacement or thermal deformation of the combustors 4 is relatively large (see FIGS. 12B, 13B and 14B), the distance d1 between the combustors 4 and the first-stage stator vane 23A becomes smaller than when displacement or thermal deformation is relatively small (see FIGS. 12A, 13A, and 14A).

In the illustrative embodiments depicted in FIGS. 12A to 14B, the second portion 82 of the first-stage stator vane 23A includes at least one recess portion 84, and each recess portion 84 of the first-stage stator vane 23A is engaged with a single seal member 200. Furthermore, in the embodiments depicted in FIGS. 12A to 13B, the second portion 82 of the first-stage stator vane 23A includes at least one recess portion 84, and in the embodiments depicted in FIGS. 14A and 14B, the second portion 82 of the first-stage stator vane 23A includes two recess portions 84.

Furthermore, of the opposite end portions of the seal member 200, the first end portion 206 is engaged with the recess portion 84 of the first-stage stator vane 23A. Furthermore, the second end portion 208 of the seal member 200 is engaged with the seal receiving space 210 formed by at least one of the pair of radial-directional wall portions 54, 54'.

More specifically, in the illustrative embodiments depicted in FIGS. 12A and 12B, the seal receiving space 210 is formed by half grooves 212 respectively disposed on the pair of radial-directional wall portions 54, 54', and the second end portion 208 of the seal member 200 is engaged with the seal receiving space 210 formed by the half grooves 212.

In this case, upon operation or the like of the gas turbine 1, the gap in the circumferential direction between the radial-directional wall portions 54, 54' of the combustors 4 (distance d1) narrows, and thus the second end portion 208 of the seal member 200 is held by the pair of radial-directional wall portions 54, 54' of adjacent combustors 4.

Furthermore, in the embodiments depicted in FIGS. 13A to 14B, the seal receiving space 210 is formed by a groove 214 disposed on one of the pair of radial-directional wall portions 54, 54', and the second end portion 208 of the seal member 200 is engaged with the seal receiving space 210 formed by one of the pair of radial-directional wall portions 54, 54'.

In the embodiments depicted in FIGS. 13A and 13B, the seal receiving space 210 is formed by the groove 214 formed on the radial-directional wall portion 54, which is one of the pair of radial-directional wall portions 54, 54'.

Furthermore, in the illustrative embodiments depicted in FIGS. 14A and 14B, the seal receiving spaces 210 are respectively formed by grooves 214 disposed on the pair of radial-directional wall portions 54, 54' respectively. Furthermore, the second portion 82 of the first-stage stator vane 23A is configured such that the two recess portions 84 are engaged with the respective first end portions 206 of the seal members 200, and the second end portions 208 of the seal members 200 are respectively engaged with the respective seal receiving spaces 210 disposed on the pair of radial-directional wall portions 54, 54'.

As described above, with the seal member 200 held between the first-stage stator vane 23A and the pair of radial-directional wall portions 54, 54' being engaged with the recess portion 84 positioned at the leading-edge side of the first-stage stator vane 23A, the effect of the seal member 200 to suppress acoustic propagation improves, and it is possible to effectively reduce combustion vibration due to acoustic propagation between the outlet portions 52 of the plurality of combustors 4.

Furthermore, even if the first-stage stator vane 23A is relatively displaced in the axial direction with respect to the seal member 200 due to thermal deformation or displacement of the relative positional relationship between the transition piece and the first-stage stator vane in the axial direction during operation of the gas turbine 1 from the positional relationship intended at the time of design, for instance, it is possible to suppress acoustic propagation between the outlet portions 52 of the plurality of combustors 4 even further, since the seal member 200 is engaged with the recess portion 84 of the first-stage stator vane 23A and the side wall surfaces 88 of the recess portion 84 and the seal member 200 overlap in the axial direction.

Furthermore, in the embodiments depicted in FIGS. 12A and 12B, the first end portion 206 of the seal member 200 is engaged with the recess portion of the first-stage stator vane 23A, and the second end portion 208 of the seal member 200 is engaged with the seal receiving space 210 formed by the half grooves 212 disposed respectively on the pair of radial-directional wall portions 54, 54'. Thus, as described above, upon operation of the gas turbine 1, for instance, the gap in the circumferential direction between the radial-directional wall portions 54, 54' of the combustors 4 (distance d1) narrows, and thus the second end portion 208 of the seal member 200 is held by the pair of radial-directional wall portions 54, 54' of adjacent combustors 4. Accordingly, the effect of the seal member 200 to suppress acoustic propagation improves, and it is possible to effectively reduce combustion vibration due to acoustic propagation between the outlet portions of the plurality of combustors.

The seal member 200 depicted in FIGS. 12A to 14B is a cloth seal including a sheet of metal cloth 204 wound around a metal thin plate 202.

In this case, with the seal member 200 having a simplified configuration using metal cloth, it is possible to implement the embodiments depicted in FIGS. 12A to 14B.

Furthermore, in the embodiments depicted in FIGS. 13A to 14, that is, in the embodiments where the second end portion 208 of the seal member 200 is engaged with the seal receiving space 210 formed by the groove 214 disposed on one of the pair of radial-directional wall portions 54, 54', during operation of the gas turbine 1, when the gap in the circumferential direction between the radial-directional wall portions 54, 54' of the combustors 4 (distance d1) narrows, the relative displacement in the circumferential direction of the groove 214 formed on one of the radial-directional wall portions 54, 54' relative to the recess portion 84 of the first-stage stator vane 23A is absorbed by deformation of the seal member 200.

In this regard, the cloth seal including the metal cloth is flexibly deformable, and thus easily deforms following the relative displacement of the radial-directional wall portions 54, 54' relative to the recess portion 84 in response to thermal deformation or displacement of the relative positional relationship in the axial direction between the first-stage stator vane and the transition piece of the combustor 4 from the positional relationship intended at the time of design. Accordingly, the effect of the seal member 200 to suppress acoustic propagation improves, and it is possible to effectively reduce combustion vibration due to acoustic propagation between the outlet portions 52 of the plurality of combustors 4.

Figure 15:
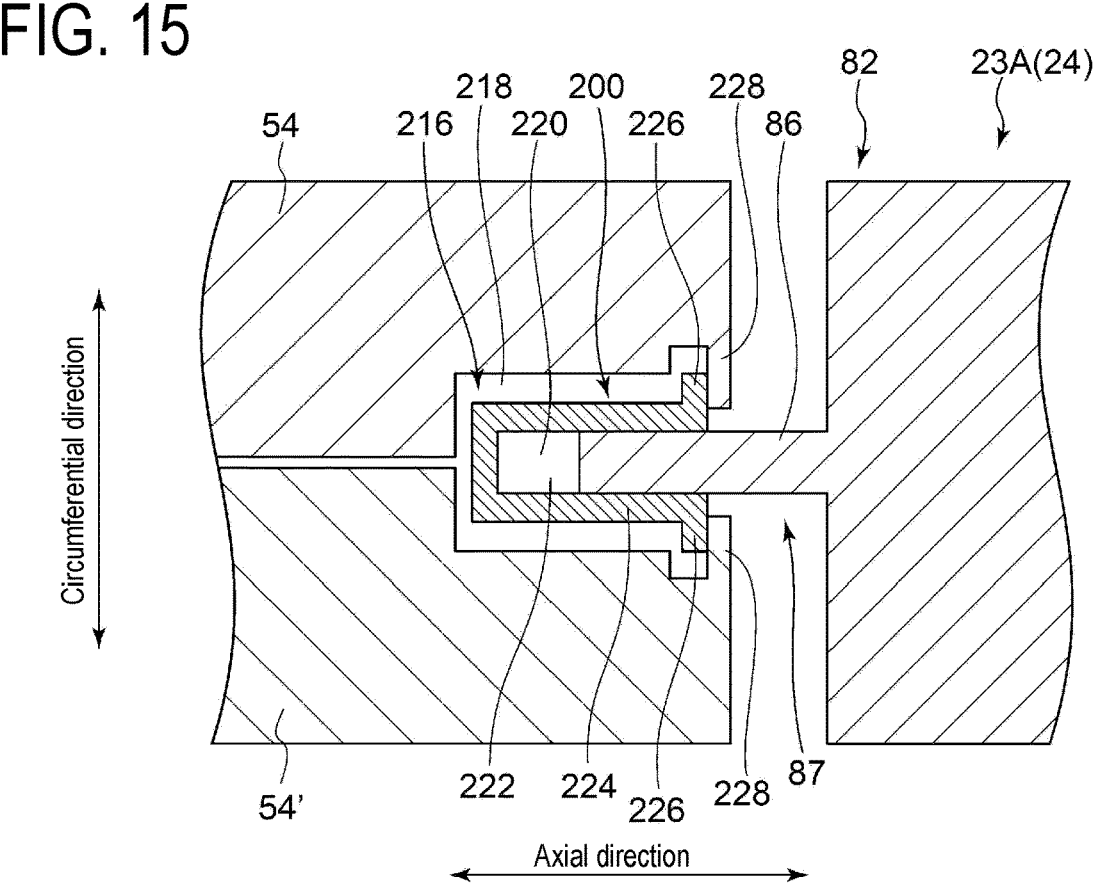
FIG. 15 is a configuration diagram of a gas turbine with a seal member according to an embodiment.
Figure 16:
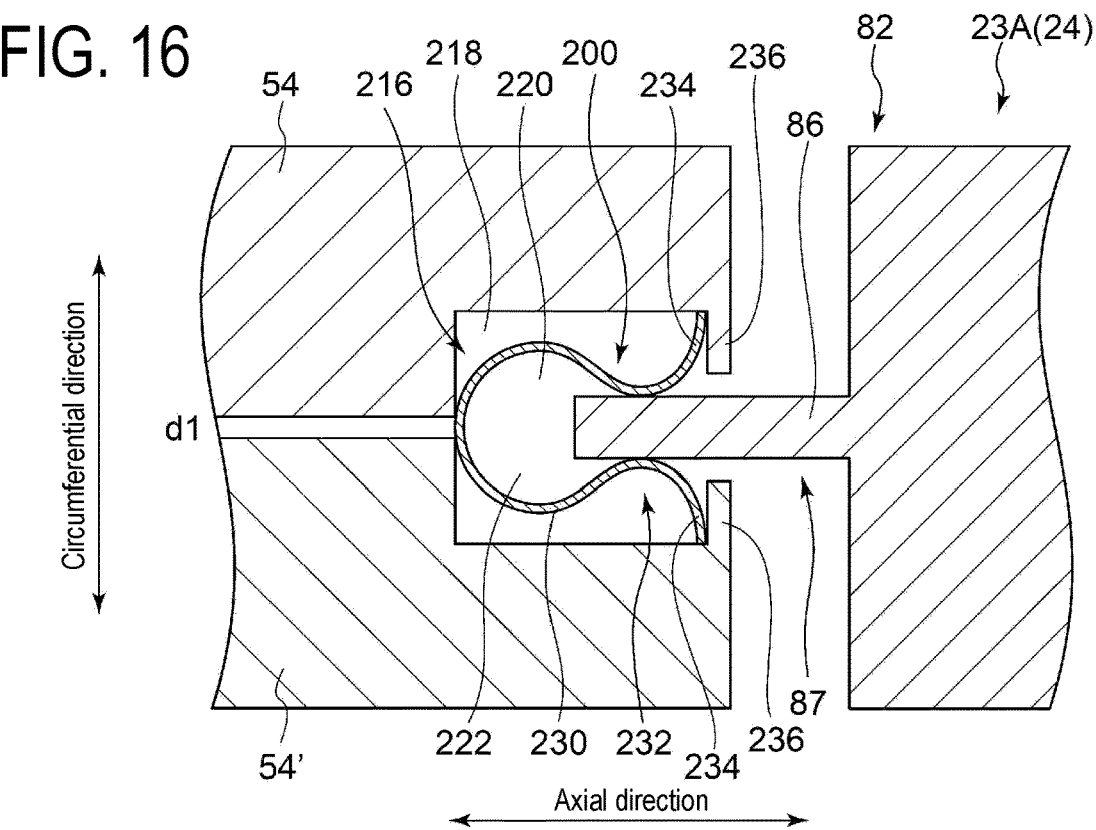
FIG. 16 is a configuration diagram of a gas turbine with a seal member according to an embodiment.

FIGS. 15 and 16 are each a diagram showing the gas turbine 1 that includes the seal member 200 according to an embodiment, where the displacement of the relative positional relationship in the axial direction between the transition piece and the first-stage stator vane from the positional relationship intended at the time of design or thermal deformation that occurs in the combustors 4 is relatively large (e.g. when the gas turbine 1 is in operation).

In the illustrative embodiments depicted in FIGS. 15 and 16, the seal member 200 is disposed inside the seal receiving space 216 formed by the pair of radial-directional wall portions 54, 54' so as to divide the seal receiving space 216 into an upstream-side chamber 218 and a downstream-side chamber 220. Furthermore, the first-stage stator vane 23A includes an upstream-side end portion 87 including the protruding portion 86 formed thereon. The protruding portion 86 is inserted at least partially into the downstream-side chamber 220 of the seal receiving space 216 so as to be in slidable contact with the seal member 200.

In the illustrative embodiments depicted in FIGS. 15 and 16, the seal member 200 includes a protruding-portion receiving space 222 that receives the protruding portion 86 of the first-stage stator vane 23A. Furthermore, the protruding portion 86 of the first-stage stator vane 23A is configured to be slidable in the axial direction relative to the seal member 200, inside the protruding-portion receiving space 222 of the seal member 200.

As described above, the protruding portion 86 of the first-stage stator vane 23A is slidable with respect to the seal member 200 inside the protruding-portion receiving space 222 of the seal member 200, and thereby the relative displacement of the first-stage stator vane 23A relative to the seal member 200 in the axial direction, that is, the relative displacement of the first-stage stator vane 23A relative to the combustors 4 becomes more allowable. Thus, it is possible to effectively reduce thermal stress that occurs in the combustors 4 during operation of the gas turbine 1.

In the embodiment depicted in FIG. 15, the seal member 200 includes a slide portion 224 that forms the protruding-portion receiving space 222, and a pair of flange portions 226 disposed so as to project in the circumferential direction from the downstream end side of the slide portion 224. The slide portion 224 is configured to be slidable in the axial direction relative to the protruding portion 86 of the first-stage stator vane 23A. The pair of flange portions 226 are positioned on both sides of the protruding portion 86 of the first-stage stator vane 23A in the circumferential direction.

Furthermore, in the embodiment depicted in FIG. 15, the pair of radial-directional wall portions 54, 54' each include a limiting portion 228 for limiting movement of the seal member 200. The limiting portion 228 is positioned downstream of the pair of flange portions 226 of the seal member 200, and configured to limit downstream movement of the seal member 200.

In the above described embodiment, the slide portion 224 of the seal member 200 is slidable in the axial direction relative to the protruding portion 86 of the first-stage stator vane 23A, and downstream movement of the flange portion 226 of the seal member 200 is limited by the limiting portions 228 of the radial-directional wall portions 54, 54'. Accordingly, it is possible to prevent the seal member 200 from falling off from the combustors 4 while allowing relative displacement of the first-stage stator vane 23A relative to the seal member 200 in the axial direction, that is, relative displacement of the first-stage stator vane 23A relative to the combustors 4.

In the embodiment depicted in FIG. 16, the seal member 200 includes a plate spring portion 230 that forms the protruding-portion receiving space 222, and a pair of leg portions 234 positioned respectively on both sides of the protruding portion 86 of the first-stage stator vane 23A in the circumferential direction. The plate spring portion 230 includes a pinch portion 232 for pinching the protruding portion 86. The pair of leg portions 234 are positioned so as to be separated from one another in the circumferential direction toward the downstream side from the pinch portion 232 of the plate spring portion 230, so as to be positioned on both sides of the protruding portion 86 of the first-stage stator vane 23A in the circumferential direction.

Furthermore, in the embodiment depicted in FIG. 16, the pair of radial-directional wall portions 54, 54' each include a limiting portion 228 for limiting movement of the seal member 200. The limiting portion 228 is positioned downstream of the pair of leg portions 234 of the seal member 200, and configured to limit downstream movement of the seal member 200.

In the above embodiment, the protruding portion 86 of the first-stage stator vane 23A is pinched by the pinch portion 232 of the seal member 200, and is movable inside the protruding-portion receiving space 222 in the axial direction, and downstream movement of the seal member 200 is limited by the limiting portion 228. Accordingly, it is possible to prevent the seal member 200 from falling off from the combustors 4 while allowing relative displacement of the first-stage stator vane 23A relative to the seal member 200 in the axial direction, that is, relative displacement of the first-stage stator vane 23A relative to the combustors 4.

Figure 17:
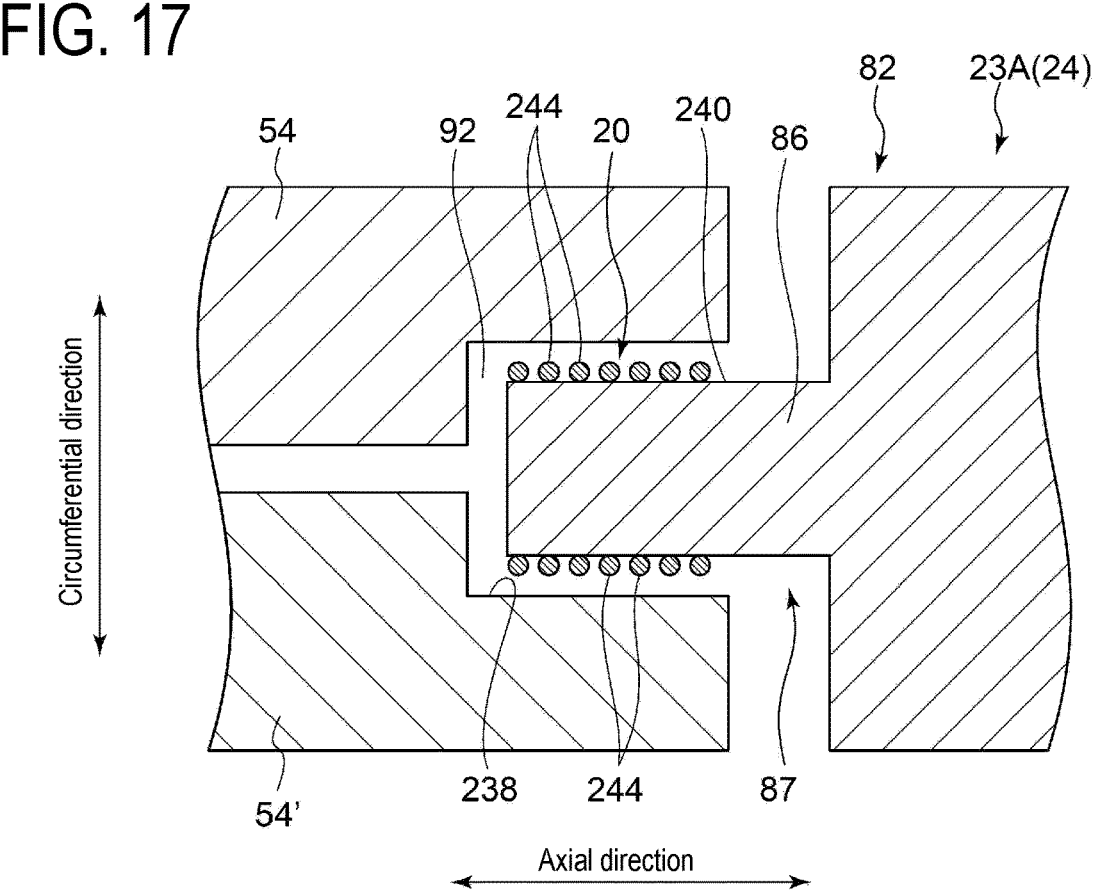
FIG. 17 is a configuration diagram of a gas turbine with a seal member according to an embodiment.
Figure 18:
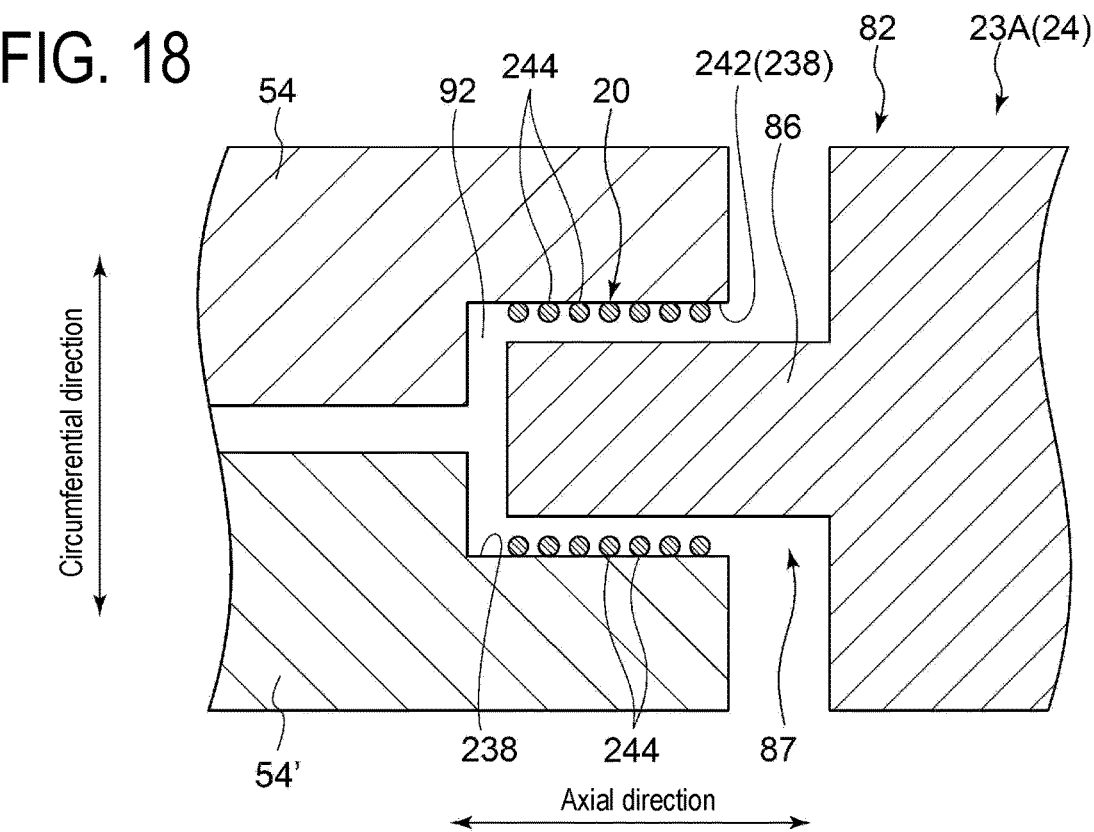
FIG. 18 is a configuration diagram of a gas turbine with a seal member according to an embodiment.
Figure 19:
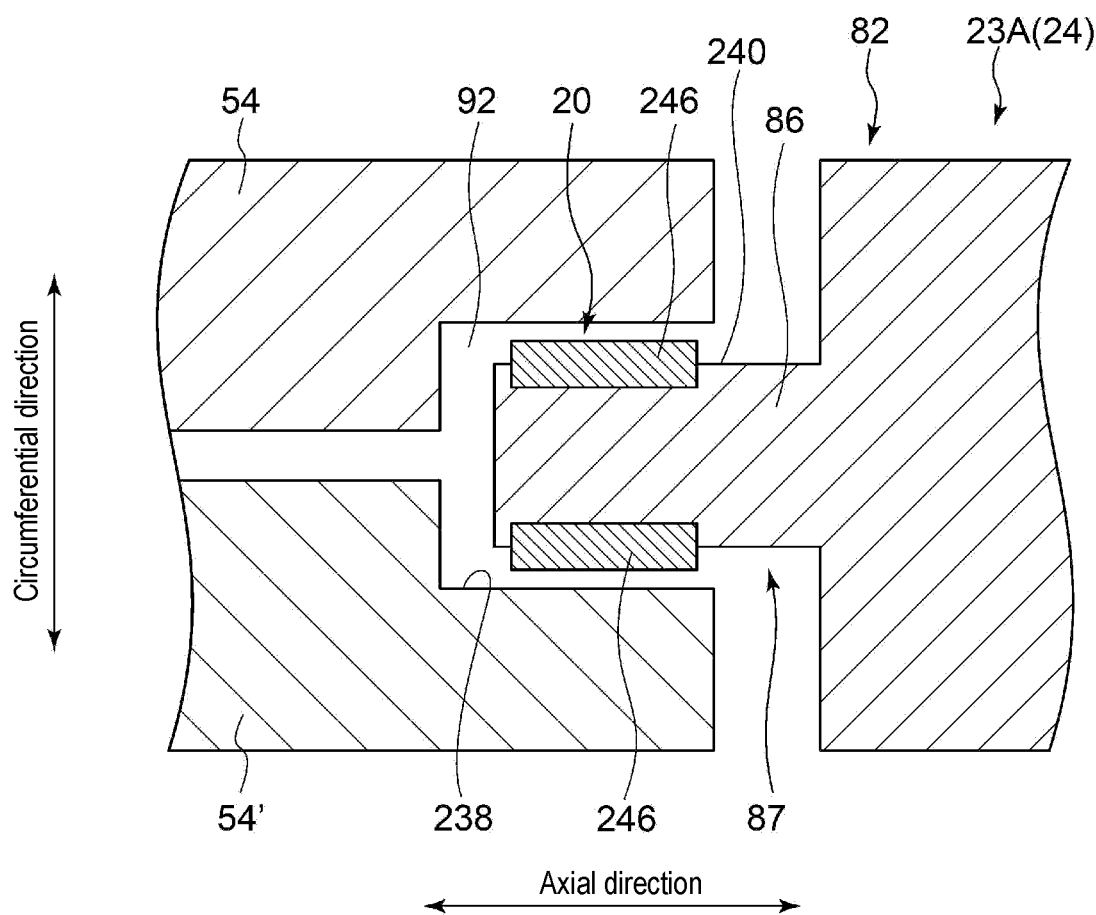
FIG. 19 is a configuration diagram of a gas turbine with a seal member according to an embodiment.

FIGS. 17 to 19 are each a diagram showing the gas turbine 1 that includes the seal member 200 according to an embodiment, where the displacement of the relative positional relationship in the axial direction between the transition piece and the first-stage stator vane from the positional relationship intended at the time of design or thermal deformation that occurs in the combustors 4 is relatively small (e.g. when the gas turbine 1 is stopped).

For instance, in the illustrative embodiments depicted in FIGS. 17 to 19, the first-stage stator vane 23A includes an upstream-side end portion 87 including the protruding portion 86 formed thereon, and the protruding portion 86 of the first-stage stator vane 23A is engaged with a protruding-portion receiving space 92 formed by the pair of radial-directional wall portions 54, 54'. Furthermore, the seal member 200 is disposed between the protruding portion 86 and the wall surface 238 along the axial direction of the pair of radial-directional wall portions 54, 54' forming the protruding-portion receiving space 92.

In the embodiment depicted in FIG. 17, the seal member 200 includes a wire seal 244 fixed to the wall surface 240 of the protruding portion 86 facing the wall surface 238 along the axial direction of the pair of radial-directional wall portions 54, 54'.

Furthermore, in the embodiment depicted in FIG. 18, the seal member 200 includes a wire seal 244 fixed to the wall surface 238 along the axial direction of the pair of radial-directional wall portions 54, 54' (wall surface facing the wall surface 240 of the protruding portion 86).

In the embodiments depicted in FIGS. 17 and 18, a plurality of wire seals 244 are disposed along the radial-directional wall portion, on the wall surfaces 238 of the pair of radial-directional wall portions 54, 54' or the wall surface 240 of the protruding portion 86.

In the above described embodiment, with the simplified configuration that uses the wire seals fixed to the wall surfaces 238 along the axial direction of the pair of radial-directional wall portions 54, 54' or the wall surface 240 of the protruding portion 86 of the first-stage stator vane 23A facing the wall surfaces 238, it is possible to suppress an increase in the gap in the circumferential direction between the radial-directional wall portions 54, 54' and the protruding portion 86 of the first-stage stator vane 23A or the seal member 200, and hinder acoustic propagation between the outlet portions 52 of the plurality of combustors 4.

In the embodiment depicted in FIG. 19, the seal member 200 includes a gasket 246 fixed to the wall surface 240 of the protruding portion 86 facing the wall surfaces 238 along the axial direction of the pair of radial-directional wall portions 54, 54'.

In another embodiment, the seal member 200 may include a gasket 246 fixed to the wall surfaces 238 along the axial direction of the pair of radial-directional wall portions 54, 54' (wall surface facing the wall surface 240 of the protruding portion 86).

In the above described embodiment, with the simplified configuration that uses the gasket 246 fixed to the wall surfaces 238 along the axial direction of the pair of radial-directional wall portions 54, 54' or the wall surface 240 of the protruding portion 86 of the first-stage stator vane 23A facing the wall surfaces 238, it is possible to suppress an increase in the gap in the circumferential direction between the radial-directional wall portions 54, 54' and the protruding portion 86 of the first-stage stator vane 23A or the seal member 200, and hinder acoustic propagation between the outlet portions 52 of the plurality of combustors 4.

In some embodiments, the gas turbine 1 includes the outlet portion 52 including the radial-directional wall portion 54 along the radial direction, a plurality of combustors 4 disposed in the circumferential direction, and at least one first-stage stator vane 23A positioned downstream of the pair of radial-directional wall portions 54, 54' facing one another of the outlet portions 52 of combustors 4 that are adjacent in the circumferential direction provided separately from the combustors 4 (see FIGS. 1 to 5).

In the gas turbine 1, the pair of radial-directional wall portions 54, 54' of adjacent combustors 4 overlap with the intermediate member 90 held between the first-stage stator vane 23A and the pair of radial-directional wall portions 54, 54' or with the upstream-side portion 248 (see FIG. 3) of the first-stage stator vane 23A in the axial direction, and the first-stage stator vane 23A includes at least one cooling hole 110 which has a first end having an opening into the cooling passage 109 formed inside the first-stage stator vane 23A and a second end having an opening on the outer surface of the upstream-side portion.

Herein, the upstream-side portion 248 of the first-stage stator vane 23A is, of the first-stage stator vane 23A, a portion positioned relatively upstream, which forms the first-stage stator vane 23A together with a downstream-side portion 250 (see FIG. 3) positioned relatively downstream.

In the above described embodiment, in the axial direction, the pair of radial-directional wall portions 54, 54' overlap with the intermediate member 90 held between the first-stage stator vane 23A and the pair of radial-directional wall portions 54, 54' or with the upstream-side portion 248 of the first-stage stator vane 23A (see FIG. 7, for instance). Thus, even if the first-stage stator vane 23A is relatively displaced mainly in the axial direction with respect to the combustors 4 due to thermal deformation or displacement of the relative positional relationship from the positional relationship intended at the time of design during operation of the gas turbine, for instance, it is possible to suppress an increase of the gap, in the circumferential direction, between the radial-directional wall portions 54, 54' and the first-stage stator vane 23A or the intermediate member 90 that brings the outlet portions 52 of adjacent combustors 4 into communication, and hinder acoustic propagation between the outlet portions 52 of the plurality of combustors 4. Thus, it is possible to reduce combustion vibration due to acoustic propagation between the outlet portions 52 of the plurality of combustors 4 while reducing thermal stress that occurs in the combustors 4 during operation of the gas turbine 1. Accordingly, the frequency of the combustion vibration that needs to be addressed decreases, and it is possible to operate the gas turbine stably.

Furthermore, according to the above described embodiment, it is possible to supply the cooling fluid from the cooling passage 109 toward the outer surface of the upstream-side portion of the first-stage stator vane via the cooling hole 110. Accordingly, it is possible to cool the first-stage stator vane 23A effectively.

In some embodiments, the gas turbine 1 includes the outlet portion 52 including the radial-directional wall portion 54 along the radial direction, a plurality of combustors 4 disposed in the circumferential direction, and at least one first-stage stator vane 23A positioned downstream of the pair of radial-directional wall portions 54, 54' facing one another of the outlet portions 52 of combustors 4 that are adjacent in the circumferential direction and provided separately from the combustors 4 (see FIGS. 1 to 5).

In the gas turbine 1, the first-stage stator vane 23A includes an upstream-side end portion 252 including the recess portion 84 formed thereon (see FIG. 8 or 10, for instance). The recess portion 84 of the first-stage stator vane 23A is engaged with at least one of the pair of radial-directional wall portions 54, 54', or the intermediate member 90 held between the first-stage stator vane 23A and the pair of radial-directional wall portions 54, 54' (see FIG. 8 or 10, for instance).

In the above described embodiment, the recess portion 84 disposed on the upstream-side end portion 252 of the first-stage stator vane 23A is engaged with at least one of the pair of radial-directional wall portions 54, 54' or the intermediate member 90, and thus it is possible to cause the recess portion 84 of the first-stage stator vane 23A to overlap with at least one of the pair of radial-directional wall portions 54, 54' or the intermediate member 90 in the axial direction.

Thus, even if the first-stage stator vane 23A is relatively displaced mainly in the axial direction with respect to the combustors 4 due to thermal deformation or displacement of the relative positional relationship during operation of the gas turbine from the positional relationship intended at the time of design, for instance, it is possible to suppress an increase of the gap, in the circumferential direction, between the recess portion 84 of the first-stage stator vane 23A and at least one of the radial-directional wall portions 54, 54' or the intermediate member 90 that brings the outlet portions 52 of adjacent combustors 4 into communication, and hinder acoustic propagation between the outlet portions 52 of the plurality of combustors 4. Thus, it is possible to reduce combustion vibration due to acoustic propagation between the outlet portions 52 of the plurality of combustors 4 while reducing thermal stress that occurs in the combustors 4 during operation of the gas turbine 1. Accordingly, the frequency of the combustion vibration that needs to be addressed decreases, and it is possible to operate the gas turbine stably.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include" and "have" are not intended to be exclusive of other components.

REFERENCE SIGNS LIST

1 Gas turbine
2 Compressor
4 Combustor
4a Downstream-side end
5 Outlet portion
6 Turbine
8 Rotor
10 Compressor casing
12 Air inlet
16 Stator vane
18 Rotor blade
20 Casing
22 Turbine casing
23A First-stage stator vane
23B Second first-stage stator vane
24 Stator vane
26 Rotor blade
28 Combustion gas flow passage
30 Exhaust chamber
32 Combustor casing
36 Combustor liner
38 First combustion burner
40 Second combustion burner
41 Casing inlet
42 Fuel port
44 Fuel port
48 Combustor basket
48 Transition piece
50 Outlet portion
52 Radial-directional wall portion
54a Downstream-side end 56 Circumferential-directional wall portion
56a Downstream-side end
58 Groove
60 Inner shroud
61 Upstream-side end surface
62 Outer shroud
63 Upstream-side end surface
70 Airfoil
72 Pressure surface
74 Suction surface
76 Trailing edge
78 Leading edge
80 First portion
82 Second portion
84 Recess portion
86 Protruding portion
87 Upstream-side end portion
88 Side wall surface
90 Intermediate member
91 Wall surface
92 Protruding-portion receiving space
94 Half groove
96 Intermediate member receiving space
97 Step surface
98 Projecting portion
98a Top surface
98b Side wall surface
99 Step surface
100 Combustor assembly
102 Stator vane unit
104 Flat surface
105 Flat portion
106 Connection point
108 Connection surface
109 Cooling passage
110 Cooling hole
112 Root portion
114 Tip portion
120 Leading-edge side end
122 Trailing-edge side end
194 Half groove
200 Seal member
202 Metal thin plate
204 Metal cloth
206 First end portion
208 Second end portion
210 Seal receiving space
212 Half groove
214 Groove
216 Seal receiving space
218 Upstream-side chamber
220 Downstream-side chamber
222 Protruding-portion receiving space
224 Slide portion
226 Flange portion
228 Limiting portion
230 Plate spring portion
232 Pinch portion
234 Leg portion
238 Wall surface
240 Wall surface
244 Wire seal
246 Gasket
248 Upstream-side portion
250 Downstream-side portion
252 Upstream-side end portion

The invention claimed is:

1. A first-stage stator vane for a gas turbine, the first-stage stator vane comprising:
   a first portion partially defining an airfoil which includes a pressure surface, a suction surface, and a trailing edge; and
   a second portion positioned at a leading-edge side of the airfoil with respect to the first portion, the second portion having a protruding portion,
   wherein the protruding portion of the second portion has a pair of side wall surfaces, and
   wherein an angle formed between the pair of side wall surfaces is less than 90 angular degrees,
   wherein the second portion includes:
   at least one flat surface disposed next to the protruding portion and extending along a circumferential direction of the gas turbine; and
   at least one connection surface disposed between the at least one flat surface and a third surface of the airfoil of the first portion, the at least one connection surface having a leading-edge side end connected to the at least one flat surface and a trailing-edge side end continuously connected to the third surface of the airfoil of the first portion.

2. The first-stage stator vane according to claim 1, wherein the at least one connection surface is configured such that a tangent direction at a connection point to the at least one flat surface forms an angle of not greater than 20 angular degrees with a bisector of the angle formed between the pair of side wall surfaces.

3. The first-stage stator vane according to claim 1, wherein the second portion includes at least one cooling hole having a first end and a second end, the first end having an opening into a cooling passage defined inside the first-stage stator vane and the second end having an opening on an outer surface of the protruding portion.

4. The first-stage stator vane according to claim 1, wherein the protruding portion extends along a vane height direction over a length that is not smaller than a half of a length between a root portion of the first-stage stator vane and a tip portion of the first-stage stator vane in the vane height direction.

5. The first-stage stator vane according to claim 1, wherein the protruding portion is disposed along a vane height direction from a root portion of the first-stage stator vane to a tip portion of the first-stage stator vane.

6. A stator vane unit for a gas turbine, the stator vane unit comprising:
   the first-stage stator vane according to claim 1; and
   a shroud disposed on at least one of a radially inner side of the first stage stator vane or a radially outer side of the first-stage stator vane,
   wherein the second portion of the first-stage stator vane extends to a position of an upstream-side end surface of the shroud in an axial direction, and
   wherein the first-stage stator vane includes a flat portion disposed next to a recess portion or the protruding portion in the circumferential direction of the gas turbine, the flat portion defining the at least one flat surface which continues to the upstream-side end surface of the shroud.

7. The stator vane unit according to claim 6, wherein an upstream-side end portion of the first-stage stator vane includes at least one cooling hole having a first end and a second end, the first end having an opening into a cooling passage defined inside the first-stage stator vane and the second end having an opening on an outer surface of the recess portion, or the second end having an opening on an outer surface of the protruding portion, or the second end having an opening on an outer surface of the at least one flat surface.

8. A gas turbine, comprising:
a plurality of combustors disposed in a circumferential direction, each of the plurality of combustors having an outlet portion including a radial-directional wall portion along a radial direction; and
a first-stage stator vane, positioned at a downstream side of a pair of the radial-directional wall portions which face one another, of the outlet portions of a pair of the combustors adjacent to one another in the circumferential direction,
wherein the first-stage stator vane comprises:
  a first portion partially defining an airfoil which includes a pressure surface, a suction surface, and a trailing edge; and
  a second portion positioned at a leading-edge side of the airfoil with respect to the first portion, the second portion having a recess portion or a protruding portion,
wherein the recess portion or the protruding portion of the second portion has a pair of side wall surfaces,
wherein an angle formed between the pair of side wall surfaces is less than 90 angular degrees, and
wherein the pair of the radial-directional wall portions of the pair of the combustors mate with the recess portion or the protruding portion of the first-stage stator vane such that the pair of the radial-directional wall portions of the pair of the combustors are fitted with the recess portion or the protruding portion of the first-stage stator vane.

9. The gas turbine according to claim 8,
wherein the pair of the radial-directional wall portions overlap, in an axial direction, with the recess portion or the protruding portion of the first-stage stator vane or with an intermediate member held between the first-stage stator vane and the pair of the radial-directional wall portions, and
wherein the first-stage stator vane includes at least one cooling hole having a first end and a second end, the first end having an opening into a cooling passage defined inside the first-stage stator vane and the second end having an opening into a gap between the first-stage stator vane and at least one of the pair of the radial-directional wall portions or the intermediate member.

10. The gas turbine according to claim 8, wherein, when the first-stage stator vane is displaced by a first distance in an axial direction away from the plurality of combustors, an increase amount of a size of a gap along a normal direction of the side wall surfaces is smaller than the first distance, the gap being formed between the first-stage stator vane and at least one of the pair of the radial-directional wall portions or the intermediate member.

11. The gas turbine according to claim 8,
the first-stage stator vane is one of a plurality of first-stage stator vanes;
wherein each of the first-stage stator vanes is disposed at the downstream side of the pair of the radial-directional wall portions for one corresponding pair of the plurality of combustors disposed adjacent to one another in the circumferential direction,
wherein the gas turbine further comprises a second first-stage stator vane disposed at a circumferential-directional position between a pair of the first-stage stator vanes adjacent to one another in the circumferential direction, and
wherein each of the pair of the first-stage stator vanes extends to an upstream side of the second first-stage stator vane.

12. The gas turbine according to claim 8,
wherein the first-stage stator vane is disposed separately from the plurality of combustors,
wherein an intermediate member is held between the first-stage stator vane and the pair of the radial-directional wall portions or the recess portion or the protruding portion of the first-stage stator vane, the intermediate member including a wall surface which is parallel to an axial direction or forms an angle of less than 45 angular degrees with the axial direction, and
wherein at least one of the pair of the radial-directional wall portions overlaps with the wall surface in the axial direction.

13. The gas turbine according to claim 8, wherein the protruding portion of the first-stage stator vane is engaged with a protruding-portion receiving space defined by at least one of the pair of the radial-directional wall portions.

14. The gas turbine according to claim 13, wherein the protruding-portion receiving space is defined by half grooves disposed on the pair of the radial-directional wall portions, respectively.

15. The gas turbine according to claim 13, wherein the protruding-portion receiving space is defined by a length difference in an axial direction of the pair of the radial-directional wall portions.

16. The gas turbine according to claim 8, further comprising:
an intermediate member disposed between the first-stage stator vane and the pair of the radial-directional wall portions so as to be engaged with an intermediate-member receiving space defined by at least one of the pair of the radial-directional wall portions.

17. The gas turbine according to claim 8, wherein a projecting portion defined by at least one of the pair of the radial-directional wall portions or an intermediate member held between the first-stage stator vane and the pair of the radial-directional wall portions is engaged with the recess portion of the first-stage stator vane.

18. The gas turbine according to claim 8, further comprising:
a seal member held between the first-stage stator vane and the pair of the radial-directional wall portions.

19. A gas turbine, comprising:
a plurality of combustors disposed in a circumferential direction, each of the plurality of combustors having an outlet portion including a radial-directional wall portion along a radial direction; and
at least one first-stage stator vane positioned downstream of a pair of the radial-directional wall portions facing one another of the outlet portions of a pair of the combustors adjacent to one another in the circumferential direction, the at least one first-stage stator vane being disposed separately from the plurality of combustors,
wherein the at least one first-stage stator vane includes an upstream-side end portion including a recess portion, and
wherein at least one of the pair of the radial-directional wall portions or an intermediate member held between the at least one first-stage stator vane and the pair of the radial-directional wall portions mates with the recess portion of the at least one first-stage stator vane such that the at least one of the pair of the radial-directional wall portions or the intermediate member is fitted in the recess portion of the at least one first-stage stator vane.

* * * * *